(12) United States Patent
Omori et al.

(10) Patent No.: US 9,054,474 B2
(45) Date of Patent: Jun. 9, 2015

(54) WIRE HARNESS INCLUDING SHORT CIRCUIT AND PRODUCTION METHOD THEREFOR

(75) Inventors: Yasuo Omori, Yokkaichi (JP); Hiroki Hirai, Yokkaichi (JP); Tetsuji Tanaka, Yokkaichi (JP); Tatsuo Tamagawa, Yokkaichi (JP); Motohiro Yokoi, Yokkaichi (JP); Kenji Okamura, Yokkaichi (JP); Takeshi Tsuji, Yokkaichi (JP); Toshifumi Ichio, Yokkaichi (JP); Toshio Shimizu, Yokkaichi (JP); Takayuki Suzuki, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 375 days.

(21) Appl. No.: 13/499,437

(22) PCT Filed: Feb. 17, 2010

(86) PCT No.: PCT/JP2010/000976
§ 371 (c)(1),
(2), (4) Date: Mar. 30, 2012

(87) PCT Pub. No.: WO2011/101890
PCT Pub. Date: Aug. 25, 2011

(65) Prior Publication Data
US 2012/0228024 A1    Sep. 13, 2012

(51) Int. Cl.
*H02G 3/04*   (2006.01)
*H01R 31/08*  (2006.01)
*B60R 16/02*  (2006.01)
*H01R 43/28*  (2006.01)

(52) U.S. Cl.
CPC ........... *H01R 31/08* (2013.01); *Y10T 29/49194* (2013.01); *B60R 16/0207* (2013.01); *H01R 43/28* (2013.01)

(58) Field of Classification Search
CPC .............. B60R 16/0207; H01R 31/08; H01B 13/01236; H01B 7/0045

USPC .......... 174/69, 70 R, 71 R, 72 R, 72 A, 84 R, 174/88 R, 90; 361/826, 827
See application file for complete search history.

(56) References Cited

U.S. PATENT DOCUMENTS 4,114,014 A * 9/1978 Shogo et al. ................ 219/56
5,432,300 A * 7/1995 Fujisawa et al. ............ 174/74 R (Continued)

FOREIGN PATENT DOCUMENTS

| GB | 2 269 708 A | 2/1994 |
| GB | 2 273 895 A | 7/1994 |

(Continued)

OTHER PUBLICATIONS

International Search Report issued in International Application No. PCT/02010/000976 on May 18, 2010 (with translation).

(Continued)

*Primary Examiner* — Angel R Estrada
*Assistant Examiner* — Dimary Lopez Cruz
(74) *Attorney, Agent, or Firm* — Oliff PLC

(57) ABSTRACT

A wire harness capable of forming a short circuit by use of a plurality of electric wires and a joint connector while being slenderized and reduced in weight. The wire harness includes a plurality of circuit modules each forming a short circuit. Each of the circuit modules, includes a plurality of electric wires, and a plurality of external-connection connectors, connected to respective first ends of the electric wires, and a joint connector, connected to respective second ends of the electric wires to short-circuit the electric wires. The electric wires constituting the circuit modules are bundled together so that the joint connector of each of the circuit modules is discretely disposed so as to be located in a vicinity of at least one of the external-connection connectors included in the circuit module, around which electric wires a binding tape is wound.

17 Claims, 17 Drawing Sheets

(56) References Cited

U.S. PATENT DOCUMENTS

| | | | |
|---|---|---|---|
| 5,829,129 A * | 11/1998 | Ito | 29/857 |
| 6,186,451 B1 * | 2/2001 | Benoit | 248/74.3 |
| 6,503,098 B2 * | 1/2003 | Aoki et al. | 439/502 |
| 7,624,503 B2 * | 12/2009 | Fukuda | 29/872 |
| 7,690,954 B2 * | 4/2010 | Watanabe et al. | 439/730 |
| 2007/0017691 A1 | 1/2007 | Izumida et al. | |

FOREIGN PATENT DOCUMENTS

| | | |
|---|---|---|
| JP | A-6-20538 | 1/1994 |
| JP | A-6-188055 | 7/1994 |
| JP | 2000-173352 A | 6/2000 |
| JP | A-2003-297451 | 10/2003 |
| JP | A-2010-55803 | 3/2010 |
| JP | A-2010-55804 | 3/2010 |
| JP | A-2010-67405 | 3/2010 |
| WO | 2005/024851 A1 | 3/2005 |

OTHER PUBLICATIONS

Jul. 2, 2013 Office Action issued in Japanese Application No. 2008-216868.

Jul. 2, 2013 Office Action issued in Japanese Application No. 2008-211860.

* cited by examiner

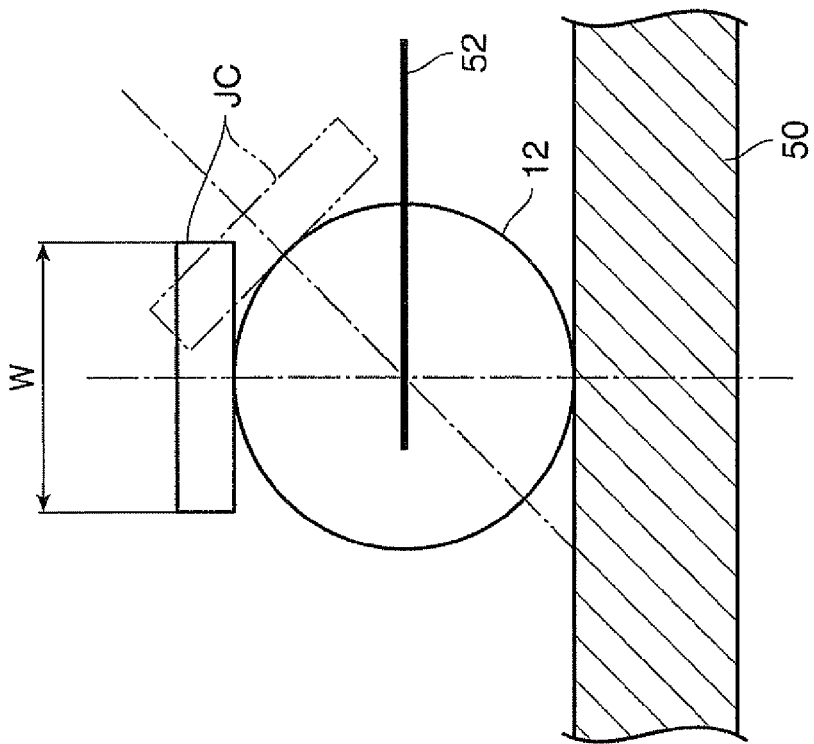
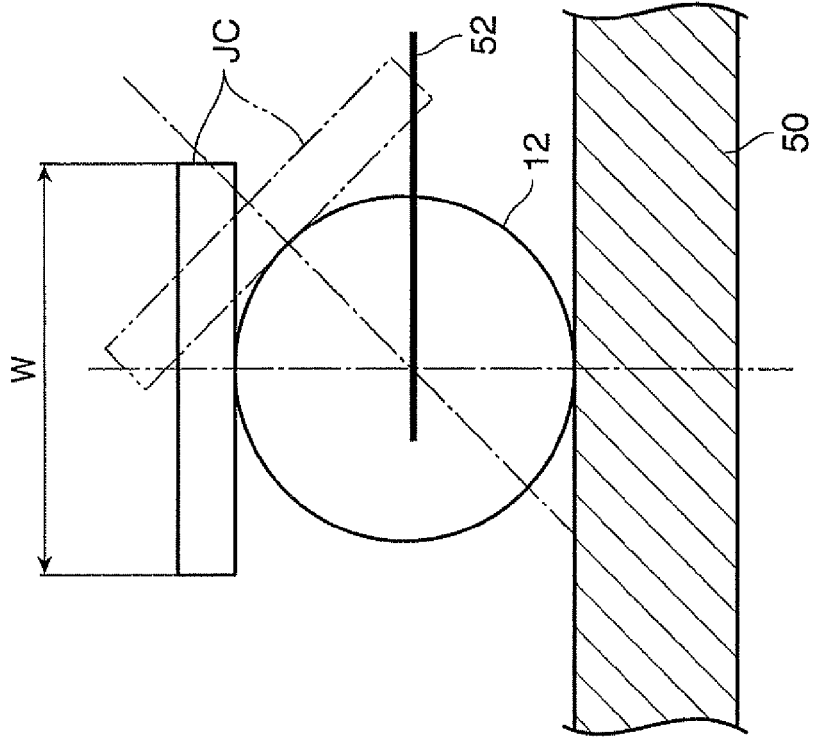

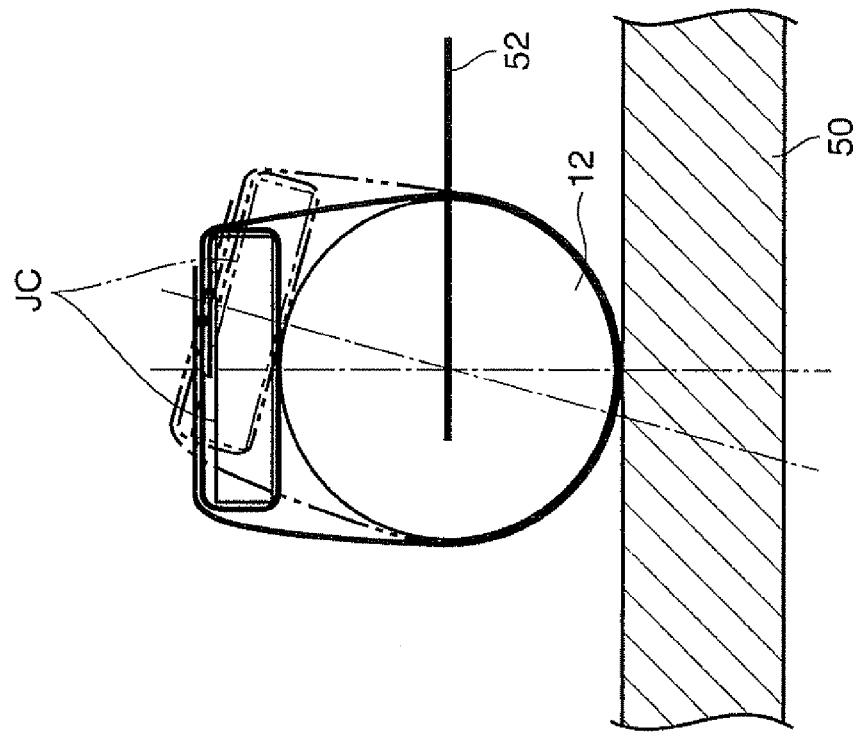
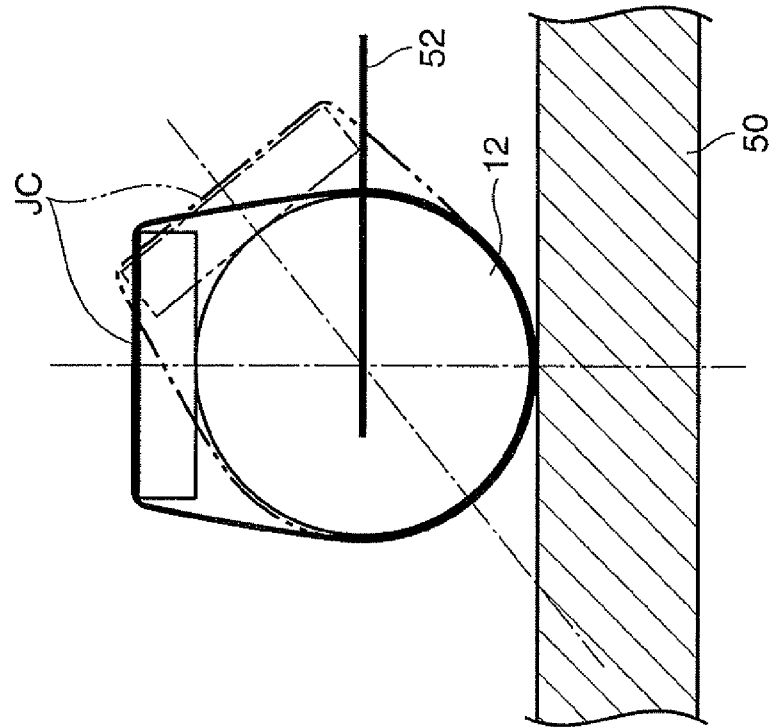

WIRE HARNESS INCLUDING SHORT CIRCUIT AND PRODUCTION METHOD THEREFOR

BACKGROUND OF THE INVENTION

FIELD OF THE INVENTION

The present invention relates to a wire harness provided in a vehicle, such as an automobile, the wire harness including a plurality of electric wires and a short circuit to short specific ones of the electric wires, and a method for producing the wire harness.

DESCRIPTION OF THE RELATED ART

Heretofore, as a wire harness including the above short circuit, there has been known one type using a joint connector for shorting the electric wires. For example, the following Patent Document 1 describes a wire harness including a trunk line, a plurality of branch wires branched therefrom and a joint connector provided at ends of the branch wires to make a short circuit in the ends.

This type of wire harness presents significant challenges of slenderizing and weight reduction thereof. It is effective for the slenderizing and weight reduction to decrease the number of electric wires thereof; however, the number is hard to decrease because the number of electric wires required for making a short circuit to be included in the wire harness is fixed.

PRIOR ART DOCUMENTS

Patent Documents

Patent Document 1: JP 2003-297451A

SUMMARY OF THE INVENTION

It is an object of the present invention to provide a wire harness capable of forming a short circuit by use of a plurality of electric wires and a joint connector, while establishing slenderizing and weight reduction thereof, and provide a method of producing the wire harness by a simple process. A wire harness according to the present invention comprises a plurality of circuit modules forming respective short circuits and a binding tape for binding the circuit modules together in a bundle, each of the circuit modules including: a plurality of electric wires; a plurality of external-connection connectors connected to respective first ends of the electric wires; and a joint connector connected to respective second ends of the electric wires to short-circuit the second ends. The electric wires constituting the circuit modules are bundled together in such a manner that the joint connector of each of the circuit modules is positioned in a vicinity of at least one of the external-connection connectors included in the circuit module, and the binding tape is wound around the bundled electric wires.

In this wire harness, where the electric wires are wired in such a manner that the joint connector included in each of the circuit modules is positioned in the vicinity of at least one of the external-connection connectors included in the circuit module and the binding tape is wound around the bundled electric wires, the wire length required between each of the external-connection connectors and the joint connector in the circuit module is allowed to be reduced, thereby enabling the wire harness to be slenderized and reduced in weight.

The present invention further provides a method for producing a wire harness which comprises a plurality of circuit modules for making up a plurality of short circuits respectively, each of the circuit modules including: a plurality of electric wires; a plurality of external-connection connectors connected to first ends of the respective wires; and a joint connector connected to respective second ends of the electric wires to short-circuit the second ends of the electric wires. The method comprises: a trunk-line forming step of bundling the electric wires included in the circuit modules to thereby form a trunk line; an external-connection connector connecting step of connecting the external-connection connector to the first end of each of the electric wires, before or after the trunk-line forming step; a joint-connector connecting step of connecting the joint connector commonly to the second ends of the electric wires included in a common one of the circuit modules, before or after the trunk-line forming step, to short-circuit the second ends; and a step of winding a binding tape around the electric wires making up the trunk line to keep the electric wires bound while, in a region where the joint-connector is disposed, winding the binding tape across and around the joint connector and the trunk continuously to fix the joint connector onto the trunk line, after completion of the aforementioned steps, the trunk-line forming step including wiring the electric wires included in each of the circuit modules in such a manner that the joint connector to be connected to the second ends of the electric wires of the circuit module through the joint-connector connecting step is positioned in a vicinity of at least one of the external-connection connectors included in the circuit module.

In this method, since the electric wires are wired in such a manner that the joint connector included in each of the circuit modules is positioned in the vicinity of at least one of the external-connection connectors included in the circuit module, the wire length required between each of the external-connection connectors and the joint connector in the circuit module can be reduced, thereby enabling the wire harness to be slenderized and reduced in weight. The binding tape is wound while the circuit modules are bundled together, and, in the region where the joint-connector is setup, winding the binding tape around the trunk line of the wire harness and fixing the joint connector onto the trunk line are continuously and efficiently performed.

BRIEF DESCRIPTION OF THE DRAWINGS

FIG. 9A shows a wiring state in the case of the joint connector having a width greater than a diameter of the trunk line of the wire harness.

FIG. 9B shows a wiring state in the case of the joint connector having a width smaller than a diameter of the trunk line of the wire harness.

FIG. 13A shows a state where the binding tape has been wound around the joint connector and the trunk line continuously without being wound around the joint connector.

FIG. 13B shows a state where the binding tape has been wound in the first winding mode.

DESCRIPTION OF EMBODIMENTS

There will be described an embodiment of the present, with reference to the drawings.

Figure 1:
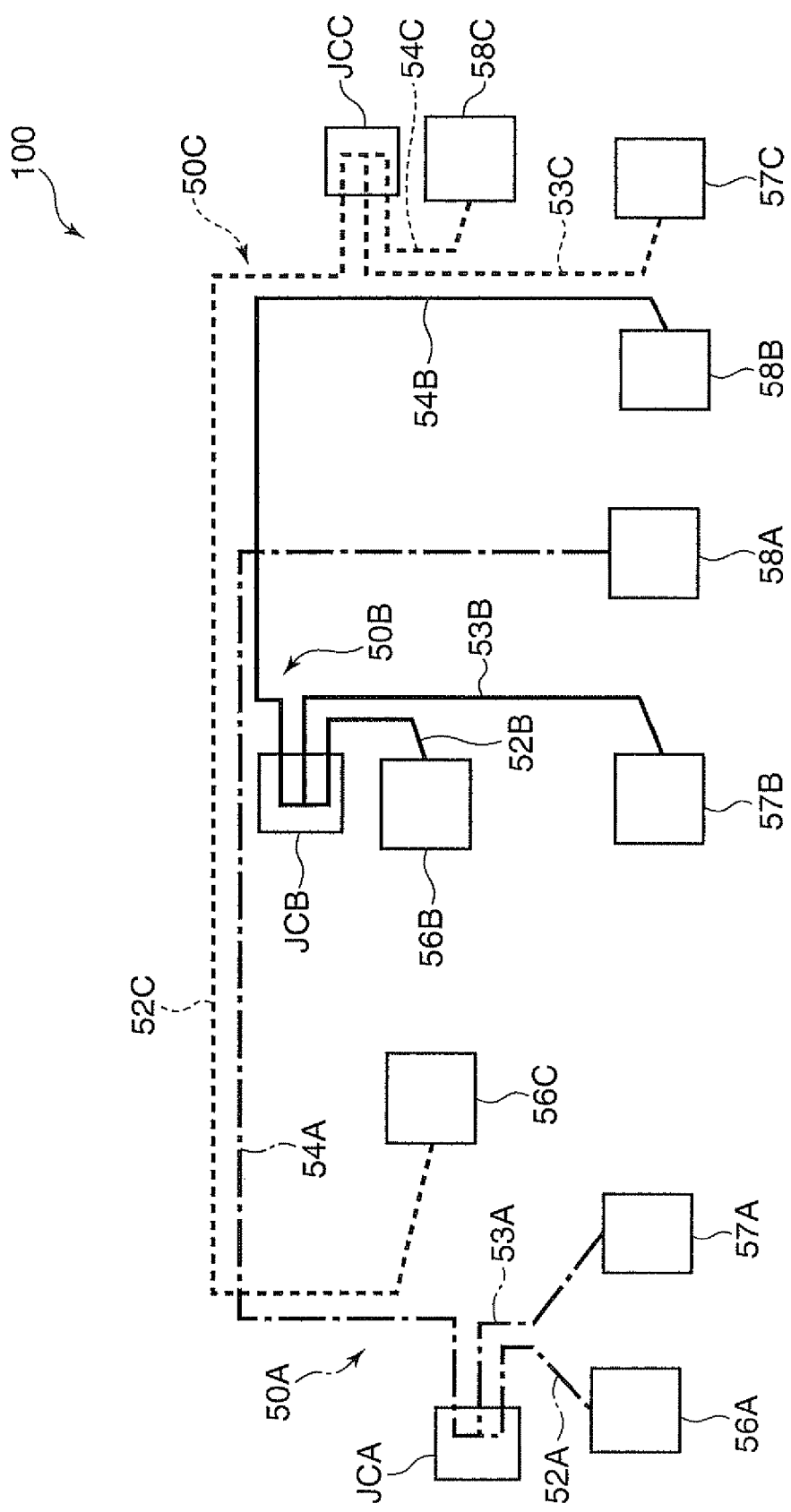
FIG. 1 is a schematic diagram showing a wiring configuration of a wire harness according to one embodiment of the present invention.

FIG. 1 is a wiring diagram of a wire harness 100 according to this embodiment. The wire harness 100 shown in FIG. 1 includes three short circuits, and comprises three circuit modules 50A, 50B and 50C for forming the respective short circuits, these circuit modules integrated together by an aftermentioned binding tape 18 shown in FIG. 4.

The number of short circuits to be included in the wire harness of the present invention is not however limited to three. There may be included a module making up any circuit other than a short circuit.

The circuit module 50A is so-called a sub-harness, comprising: a plurality of (in the shown embodiment, three) electric wires 52A, 53A and 54A; a plurality of external-connection connectors 56A, 57A and 58A connected to first ends of the respective electric wires 52A, 53A and 54A; and a joint connector JCA connected to respective second ends, opposite to the first ends respectively, of the electric wires 52A, 53A and 54A to short-circuit the second ends. Similarly, the circuit module 50B comprises a plurality of (in the shown embodiment, three) electric wires 52B, 53B and 54B, a plurality of external-connection connectors 56B, 57B and 58B connected to first ends of the respective electric wires 52B, 53B and 54B, and a joint connector JCB connected to second ends, that is, opposite to the first ends respectively, of the electric wires 52B, 53B and 54B to short-circuit the second ends; the circuit module 50C comprises a plurality of (in the shown embodiment, three) electric wires 52C, 53C and 54C, a plurality of external-connection connectors 56C, 57C and 58C connected to first ends of the respective electric wires 52C, 53C and 54C, and a joint connector JCC connected to second ends, that is, opposite to the first ends respectively, of the electric wires 52C, 53C and 54C to short-circuit the second ends.

The external-connection connectors are connected to various on-vehicle devices or other electrical loads (such as an ECU and a switch), to thereby make the devices or the like be short-circuited to each other by the short circuit. There will be described an example of a specific structure of each of the joint connectors JCA, JCB and JCC in detail later.

In each of the circuit modules 50A, 50B and 50C, the electric wires are wired in such a manner that the joint connector is discretely disposed so as to be positioned in a vicinity of (preferably, at a position adjacent to) at least one of the external-connection connectors included in the circuit module. Specifically, in the circuit module 50A, the electric wires 52A, 53A and 54A included in the circuit module 50A are wired in such a manner that the joint connector JCA is positioned in the vicinity of the external-connection connectors 56A and 57A of the external-connection connectors 56A, 57A and 58A included in the circuit module 50A. Similarly, in the circuit module 50B, the electric wires 52B, 53B and 54B included in the circuit module 50B are wired in such a manner that the joint connector JCB is positioned in the vicinity of the external-connection connector 56B of the external-connection connectors 56B, 57B and 58B included in the circuit module 50B. In the circuit module 50C, the electric wires 52C, 53C and 54C included in the circuit module 50C are wired in such a manner that the joint connector JCC is positioned in the vicinity of the external-connection connector 58C of the external-connection connectors 56C, 57C and 58C included in the circuit module 50C.

The electric wires constituting the circuit modules are bundled together to form a trunk line of the wire harness 100, so as to meet the above wiring condition, and a binding tape is wound around the electric wires forming the trunk line to thereby integrate the entire wire harness 100.

The wiring of the electric wires meeting the above wiring condition (wiring shown in FIG. 1) can drastically reduce a required length of each of the electric wires included in each of the circuit modules 50A to 50C, thus significantly contributing to slenderizing and reducing in weight of the entire wire harness 100. This effect is evidenced, for example, by comparison with the comparative example shown in FIG. 2.

Figure 2:
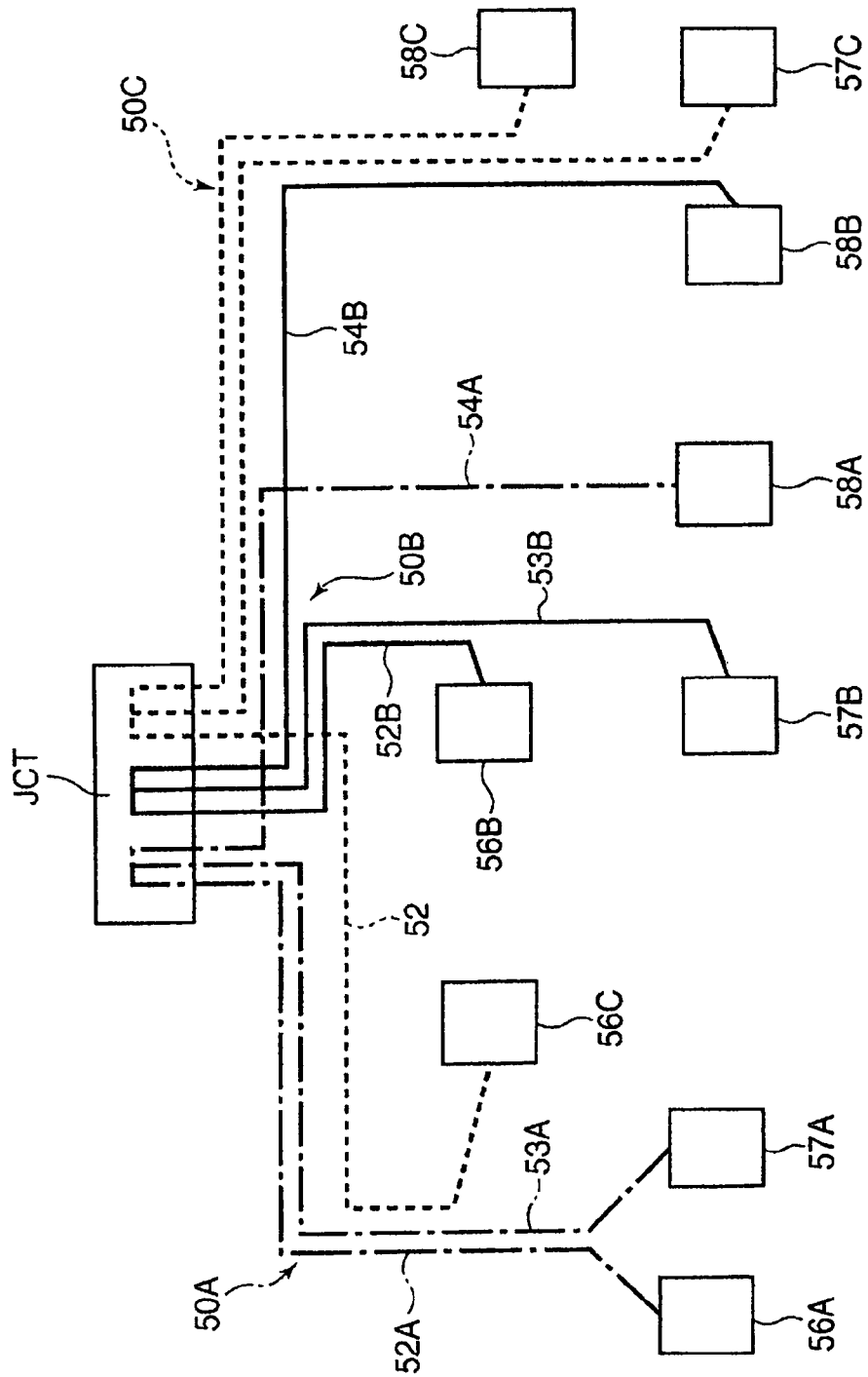
FIG. 2 is a schematic diagram showing a wiring form of a wire harness as a comparative example with respect to the present invention.

In the comparative example shown in FIG. 2, short-circuit of the electric wires in the circuit modules 50A to 50C is made by a single joint connector JCT. This case involves markedly restricting the position to provide the joint connector JCT, which makes it extremely difficult to reduce a length of each of the electric wires 52A, 52B, - - - , 53C, 54C required between the joint connector JTC and a corresponding one of the external-connection connectors 56A, 57A, - - - ,57C, 58C.

In contrast, in the wiring form shown in FIG. 1, the circuit modules 50A to 50C include the joint connectors JCA to JCC, respectively, and the joint connectors JCA to JCC are discretely disposed so that each of them is positioned in the vicinity of at least one of the external-connection connectors included in the circuit module to which the joint connector belongs. This allows the wire length between each of the joint connectors JCA to JCC and the external-connection connector adjacent thereto to be minimized, thereby makes it possible to achieve the thinning and weight reduction of the entire wire harness 100.

Figure 3:
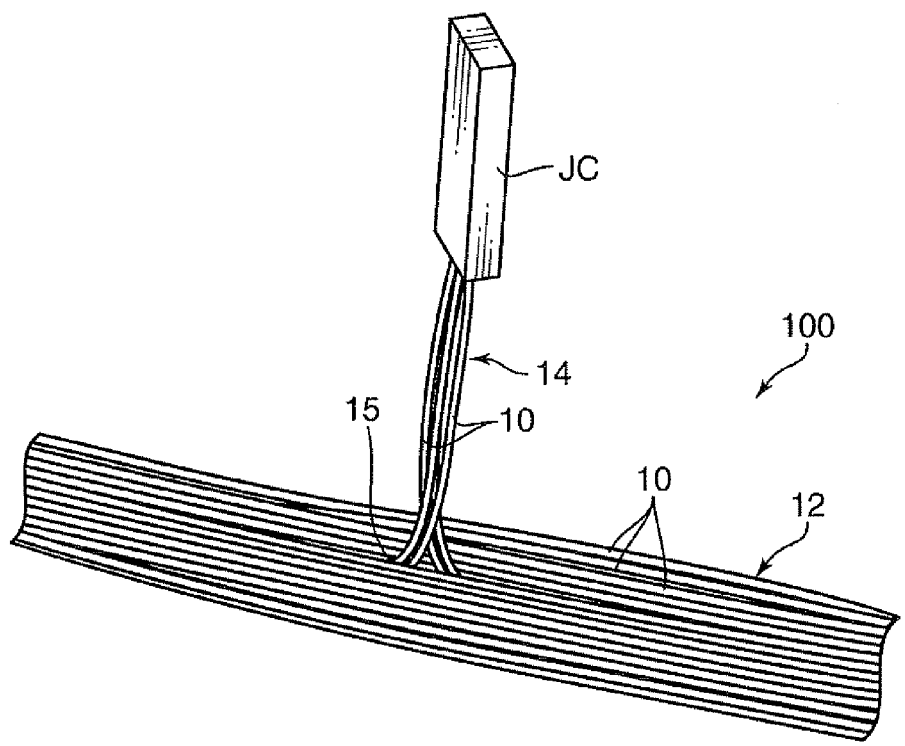
FIG. 3 is a perspective view showing one example of a short-circuit connection in the wire harness according to the embodiment, wherein a common joint connector has been connected to a plurality of ends of branch wires.
Figure 4:
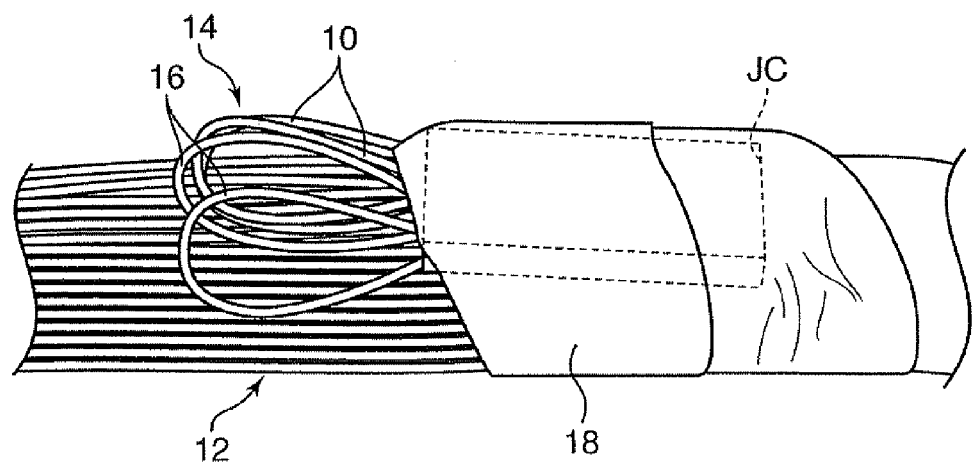
FIG. 4 is a perspective view showing one example of a short-circuit connection in the wire harness according to the embodiment, wherein the joint connector has been fixed onto a trunk line with a binding tape.

Although the connection of the external-connection connector and the joint connector to each of the electric wires is allowed to be performed in advance of the formation of the trunk line, an efficient production of the wire harness 100 will be achieved by performing the connection of the joint connector following the formation of the trunk line, for example, as shown in a short-circuit connection process shown in FIGS. 3 and 4.

Specifically, the short-circuit connection process comprises the following steps. In the following description and in FIGS. 3 to 8, for the sake of simplicity, each of the electric wires included in the circuit modules 50A, 50B and 50C will be referred to generically as "electric wire 10" using a common reference numeral. Similarly, each of the joint connectors JCA, JCB and JCC will be referred to generically as "joint connector JC". Besides, although the number of electric wires included in each of the circuit modules 50A to 50C in the embodiment shown in FIG. 1 is three, the process shown in FIGS. 3 to 8 is shown on an assumption that four electric wires 10 are short-circuited to each other.

1) Wiring of Electric Wires 10

There are formed a trunk line 12 by bundling a plurality of electric wires 10 together, and two or more (in this embodiment, four) of the electric wires 10 are extracted from the trunk line 12, as branch wires 14. As each of the electric wires 10 is used so-called a covered wire, the electric wire 10 comprising a conductor and an insulation cover which covers the conductor.

Figure 5:
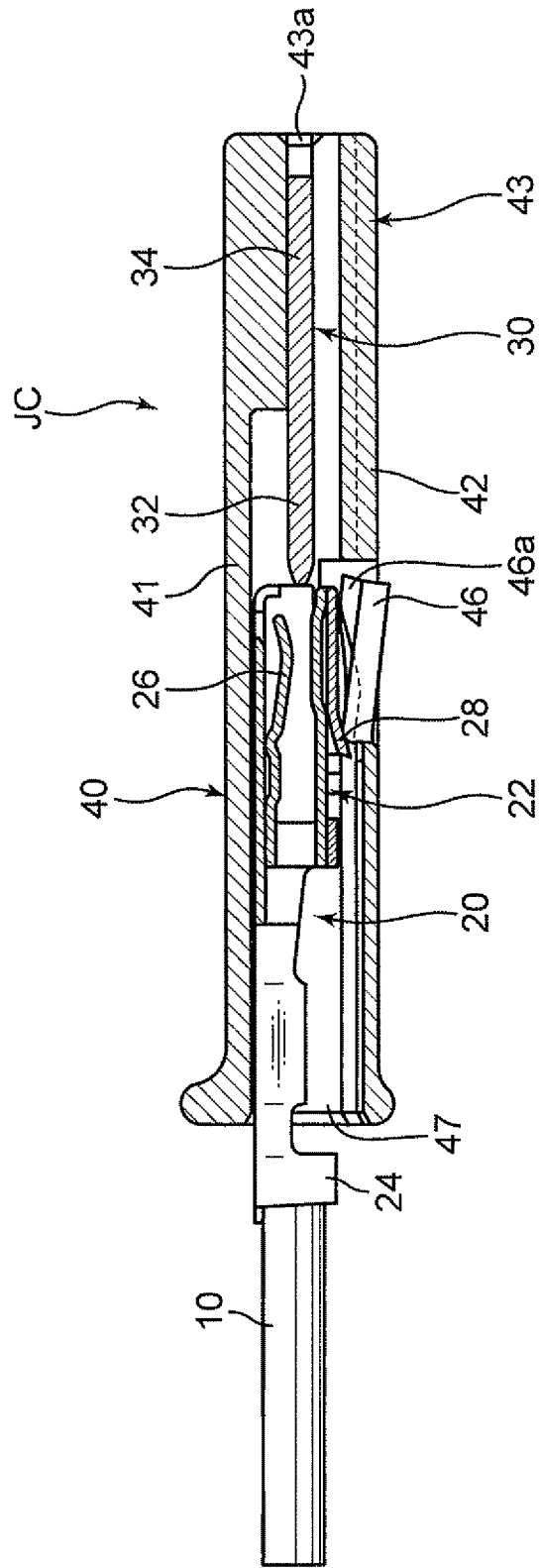
FIG. 5 is a sectional side view showing a state where a wire terminal attached to the end of the branch wire is being inserted into the joint connector.
Figure 6:
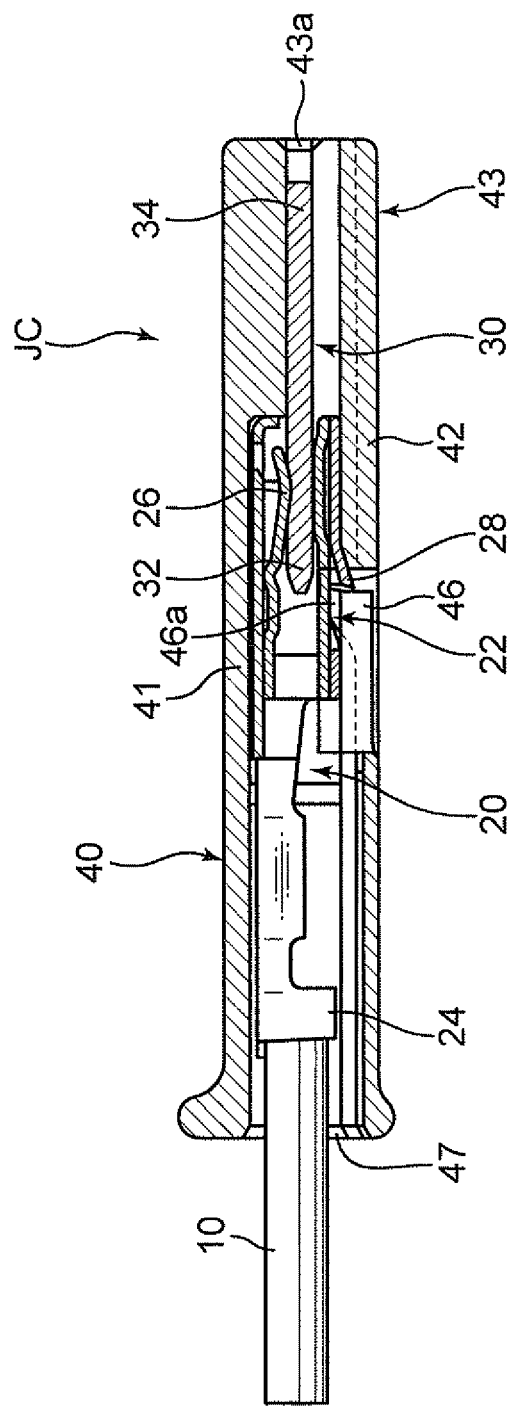
FIG. 6 is a sectional side view showing a state where the wire terminal attached to the end of the branch wire has been fully inserted into the joint connector.

In this embodiment, in order to connect each of the branch wires 14 to a common one of the joint connectors JC, there is preliminarily attached a wire terminal 20 as shown in FIGS. 5 and 6 to an end of each of the branch wires 14. The wire terminal 20 has a female-type electric contact section 22 and an electric-wire crimp section 24 in front and rear regions thereof, respectively. The electric contact section 22 has a angular tubular-shaped hollow body, and a contact spring 26 deflectably provided inside the hollow body. The electric contact section 22 has a bottom wall, from which a lockable piece 28 to be locked by the joint connector JC protrudes outwardly.

The end of each of the branch wires 14 is preliminarily subjected to a removal treatment of the insulation cover to expose the conductor. The electric-wire crimping section 24 is bent so as to enfold an end of the conductor and the insulation cover in the vicinity of the end of the conductor, thereby crimped onto the end of the branch wire 14 and electrically connected to the conductor.

2) Connection to Joint Connector JC

The wire terminals 20 attached to respective ones of the branch wires 14 are connected to a joint connector JC as shown in FIGS. 5 to 8, thereby being short-circuited to each other.

The joint connector JC shown in FIGS. 5 to 8 comprises a single short-circuiting conductor 30 and an insulation housing 40 for holding the short-circuiting conductor 30. The short-circuiting conductor 30 is made of a conductive material and adapted to be commonly connected to the wire terminals 20 to short-circuit the wire terminals 20. The insulation housing 40 is entirely molded, as a single piece, of an insulating material such as a synthetic resin, having a shape capable of holding the short-circuiting conductor 30 while accommodating it, specifically, a shape flattened in a thickness direction of the short-circuiting conductor 30.

The short-circuiting conductor 30 in this embodiment is formed of a short-circuiting metal plate which is formed by punching a single metal plate into an appropriate shape, integrally having a plurality of electric contact portions 32 and a short-circuiting portion 34. The electric contact portions 32, each of which is a male (tab)-type fitting portion which can be fittingly inserted into the female-type electric contact section 22 of each of the wire terminals 20, are arranged in a direction parallel to a width direction of the short-circuiting conductor 30. The short-circuiting portion 34 extends in an arrangement direction of the electric contact portions 32 and is continuous with a base end of each of the electric contact portions 32.

The insulation housing 40 integrally has a top wall 41 and a bottom wall 42 which are flat plate-shaped and parallel to each other, and further a pair of side walls 44 each connecting opposed respective ones of widthwise opposite ends (i.e., left ends and right ends) of the wall 41 and 42. The walls 41, 42 and 44 constitute an outer wall of the insulation housing 40.

The outer wall has a rear end portion (in FIGS. 5 to 8, a right end portion) which serves as a conductor holding portion 43. The conductor holding portion 43 has an opening 43a through which the short-circuiting portion 34 of the short-circuiting conductor 30 is press-inserted into the conductor holding portion 43, holding the short-circuiting portion 34 by the press-fit.

Figure 7:
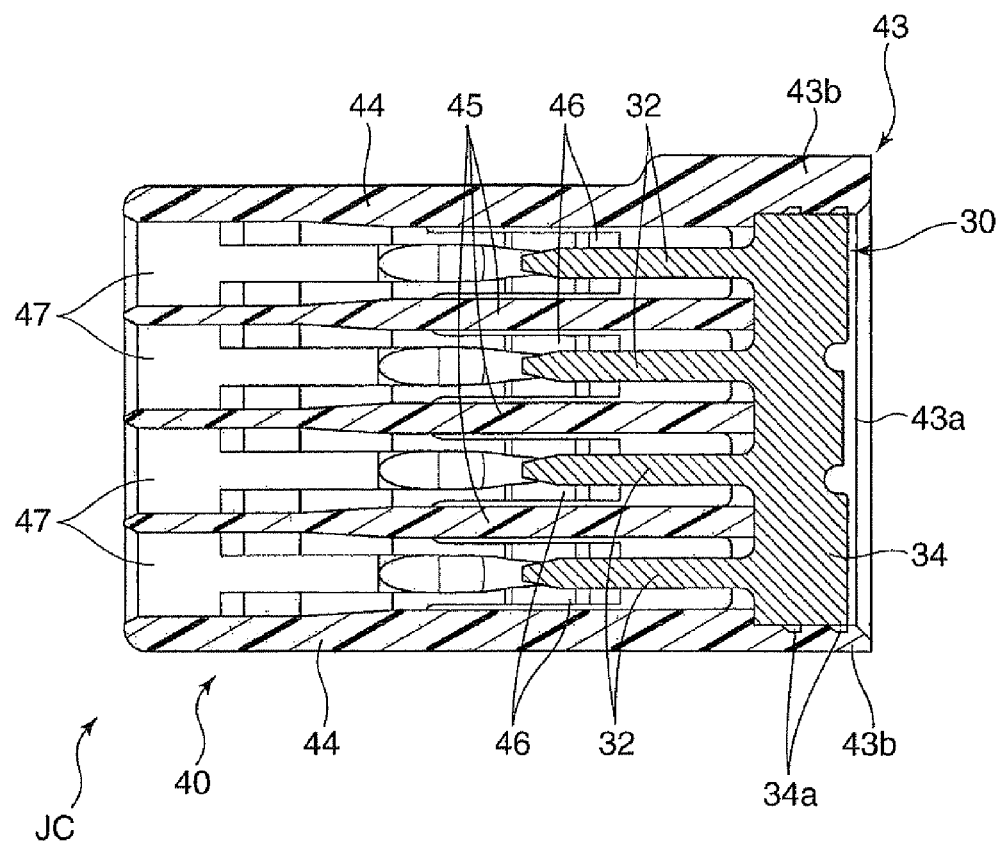
FIG. 7 is a sectional top plan view of the joint connector.
Figure 8:
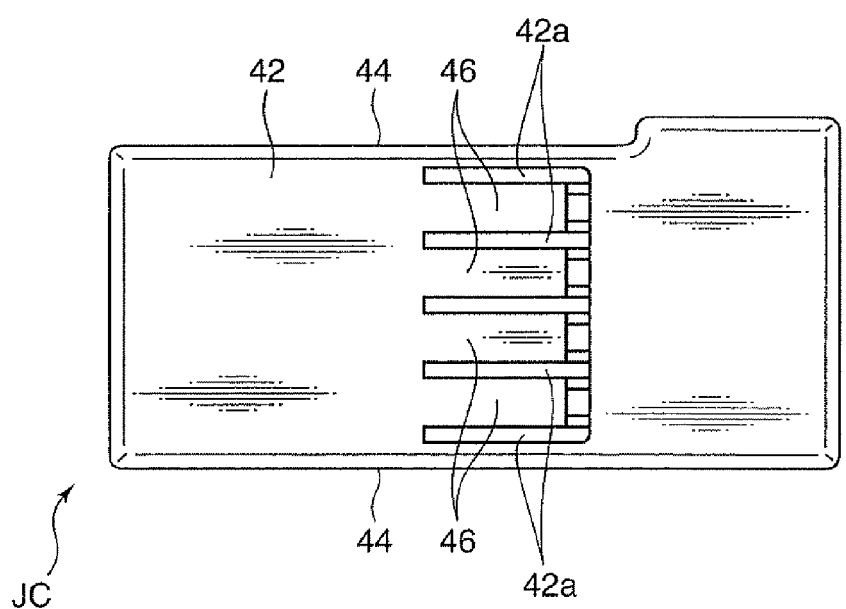
FIG. 8 is a bottom view of the joint connector.

The conductor holding portion 43 has a shape capable of holding the short-circuiting portion 34 of the short-circuiting conductor 30. Specifically, it has an outer shape larger than that of the short-circuiting portion 34 and extending in the arrangement direction of the electric contact portions 32 of the short-circuiting conductor 30, surrounding the short-circuiting metal plate insertion opening 43a into which the short-circuiting portion 34 can be inserted from a rear side (in FIG. 7, a left side). Through the insertion opening 43a, the short-circuiting portion 34 is press-inserted into the conductor holding portion 43 in such a posture that the electric contact portions 32 are directed frontward. In detail, the short-circuiting portion 34a is formed with a protrusion 34a as shown in FIG. 7 at each of the widthwise opposite ends thereof, and the protrusions 34a is bitten into an inner surface of the conductor holding portion 43 to thereby fix the short-circuiting portion 34 to the conductor holding portion 43.

Frontward of the conductor holding portion 43A, there are arranged, widthwise of the joint connector, a plurality of (in FIG. 7, three) partition walls 45 each parallel to the side walls 44. Each of the partition walls 45 defines a terminal-receiving chamber 47 in cooperation with an adjacent one of the remaining partition walls 45 or one of the side walls 44. Each of the terminal-receiving chambers 47 has an opening which opens frontward, and is so shaped as to allow the wire terminal 20 to be inserted into the terminal-receiving chambers 47 through the opening. The electric contact portions 32 of the short-circuiting conductor 30 are disposed to protrude into the respective terminal-receiving chambers 47 from the rear side. The electric contact section 22 of the wire terminal 20 is adapted to be fitted with a corresponding one of the electric contact portions 32 when inserted into one of the terminal-insertion chambers 47, and thereby the wire terminal 20 and the short-circuiting conductor 30 are electrically conducted to each other.

The bottom wall 42 is formed with a plurality of lances (terminal-locking pieces) 46 at respective positions corresponding to the terminal-receiving chambers 47. Each of the lances 46 is surrounded by a generally angular C-shaped slit 42a (FIG. 8) formed in the bottom wall 42, having a free end so deformable as to be deflected, with respect to a body of the bottom wall 42, in a thickness direction of the bottom wall 42. The free end is formed with a pawl-like locking portion 46a, which allows the wire terminal 20 to pass through the locking portion 46a by its deflection as shown in FIG. 5 due to contact with the inserted wire terminal 20, and thereafter elastically returns to its normal position to constrain the lockable piece 28 of the wire terminal 20 at a rear side thereof. In other words, it locks the wire terminal 20 in a position where the wire terminal 20 is fitted with the electric contact portion 32.

The joint connector JC thus achieves short-circuiting of the respective wire terminals 20 through the short-circuiting conductor 30, by the insertion of the wire terminals 20 at the respective ends of the branch wires 14 into the respective terminal-receiving chambers 47 involving the fit of the wire terminal 30 with the respective electric contact portions 32 of the short-circuiting conductor 30.

3) Setup of Joint Connector JC

The joint connector JC thus connected to the branch wires 14 is set up on the trunk line 12 while the branch wires 14 is folded. Specifically, in this process, the joint connector JC is set up on a location in a vicinity of a branch starting position 15 (FIG. 3) of the branch wires 14 while an intermediate portion 16 of each of the branch wires 14 is so folded as to bulge in a direction along the trunk line 12. This setup operation, for example, may be performed by simply pressing the joint connector JC with operator's fingers or the like immediately before a subsequent tape winding operation, or by temporarily fastening the joint connector JC by use of an adhesive tape or the like.

Each of the thus folded branch wires 14 has a slack portion which is shorter than an original overall length of the branch wire 14 (in this embodiment, about one-half of the overall length); therefore, an after-mentioned binding tape 18 will be easily wound. The present invention is, however, not limited to the embodiment where the branch wires 14 are folded, but permits the joint connector JC to be set up while the branch wire 14 runs along the trunk line 12.

4) Tape Winding Operation

The binding tape 18 is spirally wound around the electric wires 10 which constitute the trunk line 12 to keep the electric wires bound. The binding tape 18 may be wound so as to cover the entire surface of the trunk line 12 as shown in FIG. 4, or so as to leave spaces each exposing a part of the trunk line 12.

Furthermore, in a location where the joint connector JC is set up, the binding tape 18 is continuously wound around and across the joint connector JC, the branch wires 14 connected to the joint connector JC, and the trunk line 12, as shown in FIG. 4, which allows the joint connector JC to be efficiently fixed by use of the binding tape 18. The thus fixed joint connector JC and branch wires 14, which are covered by the binding tape 18 from thereoutside, are prevented from direct contact with other member, which facilitates handling the wire harness 100. In addition, the branch wires 14 folded as above-mentioned are made compact, and the slack of the branch wires 14 provided by the folding protects a connection region between the joint connector JC and each of the branch wires 14 from a large tensile force. For example, in the case of fixing each of the branch wires 14 in a linearly tensioned state, a displacement of the joint connector JC with respect to the trunk line 12 or the like may cause a tensile force to release the connection between the joint connector JC and the branch wire 14; however, the slack of the branch wires 14 prevents the occurrence of such a tensile force.

In the present invention, the joint connector JC is not limited to a specific shape or structure. However, in the case of such a flattened outer shape of the joint connector JC as shown (a shape flattened in a thickness direction of the short-circuiting conductor 30 formed of a single metal plate), a protrusion length of the joint connector JC beyond the trunk line 12 is effectively reduced by fixing the joint connector JC onto the trunk line 12 in such a posture that the short-circuiting conductor 30 crosses approximately perpendicularly to a radial direction of the trunk line 12. The reduction of the protrusion length can contribute to further slenderizing the entire wire harness 100.

Particularly, it is preferable that the joint connector JC has a width dimension 0.8 times or less of a diameter of the trunk line 12. This width dimension can realize both of stably fixing the joint connector JC onto the trunk line 12 and avoiding a trouble of contact of the joint connector JC, which widthwise protrudes beyond the trunk line 12, with other member.

For example, under a situation where the trunk line 12 of the wire harness is wired on a surface of a vehicle body 50 as shown in FIGS. 9A and 9B, if a width dimension W of the joint connector JC fixed on to the trunk line 12 of the wire harness is greater than a diameter of the trunk line 12 as shown in FIG. 9A, the joint connector JC may come into contact with other member 52 of the vehicle body due to the displacement of the joint connector JC with respect to the trunk line 12 in a circumferential direction of the trunk line 12, thus causing the occurrence of abnormal noise or the like; in contrast, if the width dimension W of the joint connector JC is equal to or less than the diameter of the trunk line 12 as shown in FIG. 9B, the contact of the joint connector JC with the other member 52 can be avoided in spite of some displacement of the joint connector JC with respect to the trunk line 12.

(Material of each Electric Wire)

Each of the electric wires is basically formed of a copper-based electric wire (an electric wire comprising a conductor made of copper or a copper alloy) having low resistance and high antirust performance. In the above wire harness 100, however, at least one of the circuit modules 50A, 50B and 50C is allowed to be a composite circuit module including the copper-based electric wire and a non-copper based electric wire other than the copper-based electric wire. Specifically, at least one of the circuit modules 50A, 50B, 50C is allowed to be the composite circuit module, or all of the circuit modules 50A, 50B and 50C are allowed to be the composite circuit modules. For example, in the case that the circuit module 50A is the composite circuit module, it is permitted that a non-copper based electric wire is used for a part of the electric wires 52A, 53A and 54A while a copper-based electric wire may be used for the other part of the electric wires.

As the non-copper based electric wire, in view of slenderizing and weight reduction of the wire harness 100, preferable is: a composite electric wire comprising a conductor which includes a strand made of copper or a copper alloy and a strand made of stainless steel; or an aluminum-based electric wire comprising a conductor made of aluminum or an aluminum alloy. The composite electric wire can be slenderized because of containing high-strength stainless steel, so that it can be formed as an electric wire having a diameter less than that of the copper-based electric wire. Besides, the aluminum-based electric wire, which has a weight per unit length less than that of the copper-based electric wire, can be formed as an electric wire having a specific gravity lower than the copper-based alloy; therefore, the use of the aluminum-based electric wire can contribute to weight reduction of the entire wire harness.

On the other hand, the non-copper electric wires are extremely restricted to be used. For example, the composite electric wire, having a resistance greater than that of the copper-based electric wire, is restricted to be used in a region of a high required voltage. The aluminum-based electric wire, which is formed of aluminum or an aluminum alloy more rust-prone and lower in strength than copper or a copper alloy, is hard to use in a region subjected to rain water or the like, or a region inevitably subjected to significant bending.

The restrictions imposed on the non-copper based electric wires, however, can be overcome by a combined use of the non-copper based electric wire and the copper-based electric wire for at least one of the circuit modules. Specifically, with the use of the composite electric wire as the non-copper based electric wire, the copper-based electric wire may be used in the region of a high required voltage, while, with the use of the aluminum-based electric wire as the non-copper based electric wire, the copper-based electric wire may be used in the region subjected to rain water or the like or the region inevitably subjected to significant bending.

The electric wires thus constituting the circuit modules are bundled together to thereby form the trunk line of the wire harness 100, and the binding tape is wound around the electric wires forming the trunk line to thereby integrate the entire wire harness 100. In this wire harness 100, the use of the non-copper based electric wire included in at least one of the circuit modules can significantly contribute to the slenderizing and weight reduction of the entire wire harness 100.

This effect is also true in the wiring form already shown in FIG. 2 as a comparative example. In the comparative example, the respective electric wires of the circuit modules 50A to 50C are short-circuited by the common joint connector JCT. However, this involves a significant restriction of a setup location of the joint connector JCT, which increases a required length of each of the electric wires 52A, 52B, - - -, 53C, 54C between the joint connector JCT and a corresponding one of the external-connection connectors 56A, 57A, - - -, 57C, 58C. Accordingly, for slenderizing and weight reduction of the entire wire harness 100, the wiring form as shown in FIG. 1 is preferable.

(Modes of Ringing Tape Winding)

Figure 10:
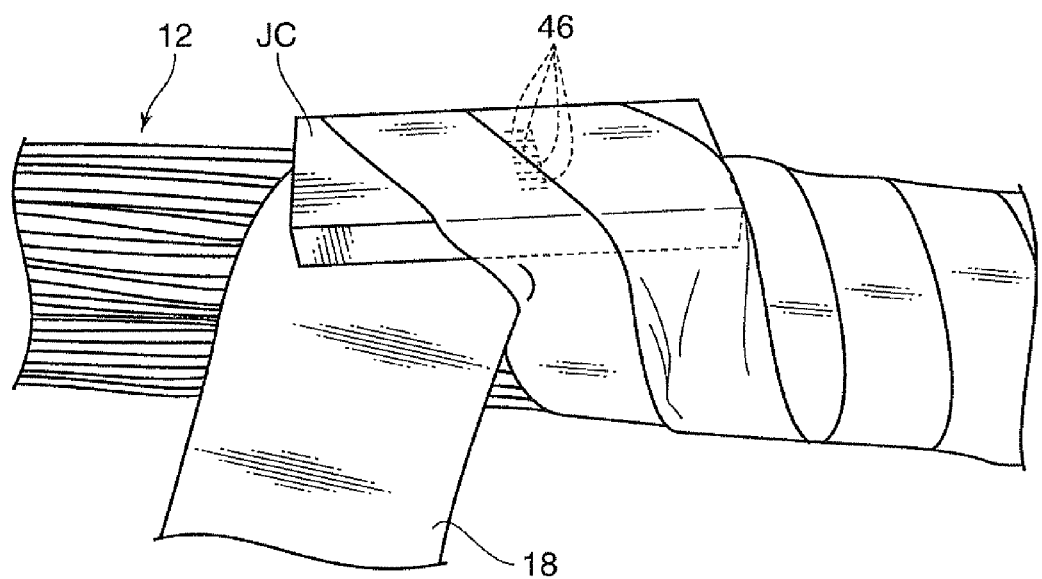
FIG. 10 is a perspective view showing a first winding mode of the binding tape.
Figure 11:
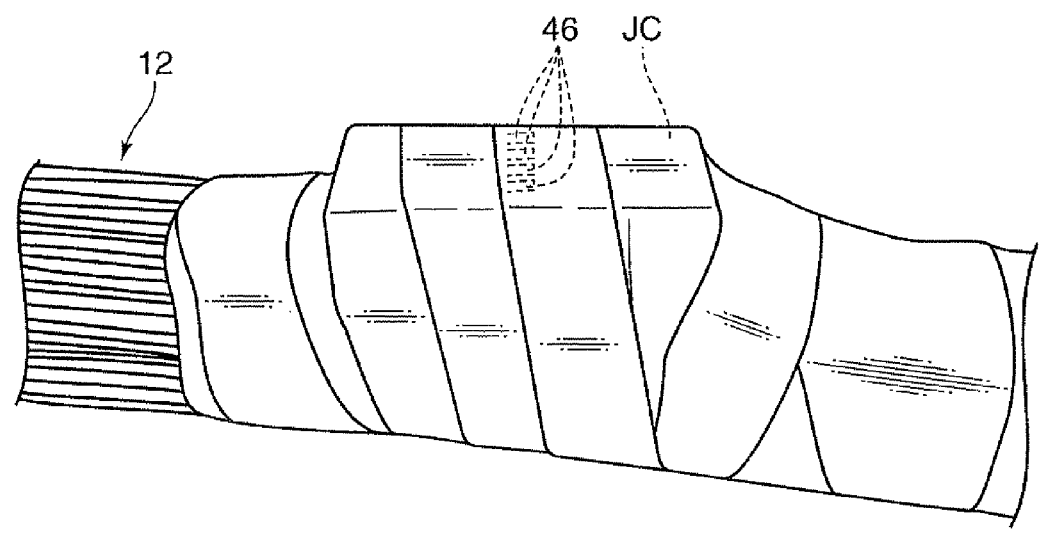
FIG. 11 is a perspective view showing a state where the joint connector has been fixed onto the trunk line with the binding tape in the first winding mode.
Figure 12:
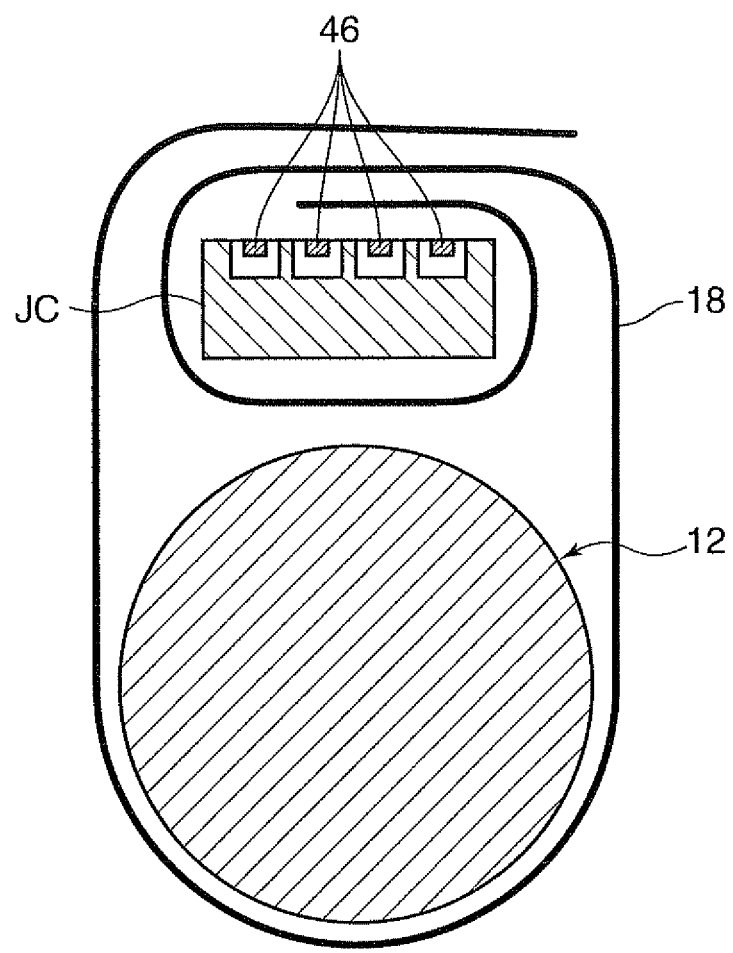
FIG. 12 is a cross-sectional view showing a state where the joint connector has been fixed onto the trunk line with the binding tape in the first winding mode.

As for winding the binding tape 18, there are various effective modes. In a first winding mode shown in FIGS. 10 to 12, there is firstly made at least one turn of the binding tape 18 around the joint connector JC (FIGS. 10 to 12 shows an example of one turn). Herein, the binding tape 18 is wound around the insulation housing 40 so as to cross and pass over all of the lances 46 formed in the bottom wall 42 of the insulation housing 40 in the joint connector JC. The binding tape 18, consecutively following at least one turn around the insulation housing 40, is continuously wound across and around the joint connector JC around which the binding tape 18 is already wound and the trunk line 12. This establishes an efficient fixing of the joint connector JC with the binding tape 18.

The thus fixed joint connector JC and branch wires 14 are covered by the binding tape 18 from outside and prevented from direct contact with other member; this facilitates handling the wire harness 100.

Furthermore, since the binding tape 18 is wound across and around the joint connector JC around which the binding tape 18 is already wound and the trunk line 12, consecutively following one turn around the joint connector JC, the wounded binding tape 18 suppresses a displacement of the joint connector JC with respect to the trunk line 12 circumferentially of the trunk line 12. Thus, the joint connector JC is prevented from being displaced circumferentially of the trunk line 12 to come into contact with other member.

For example, under a condition that the trunk line 12 of the wire harness 100 is wired on a surface of a vehicle body 50 as shown in FIG. 13A, in the case of the wire harness 100 which is fixed onto the trunk line 12 by simply winding the binding tape 18 across and around the joint connector JC and the trunk line 12 continuously without winding the binding tape 18 around the insulation housing 40, the joint connector JC is likely to be displaced circumferentially of the trunk line 12 due to vehicle vibration or the like, and the displacement may bring the joint connector JC into contact with other member 52 of the vehicle body to thereby cause abnormal noise or the like. However, in the case where the binding tape 18, consecutively following at least one turn around the insulation housing 40, is continuously wound across and around the joint connector JC around which the binding tape 18 is already wound and the trunk line 12, like the winding mode shown in FIG. 13B, a portion of the binding tape 18 wound around the joint connector JC suppresses the displacement of the joint connector JC in the circumferential direction of the trunk line 12, thereby preventing the joint connector JCT from contact with other member 52.

Figure 14:
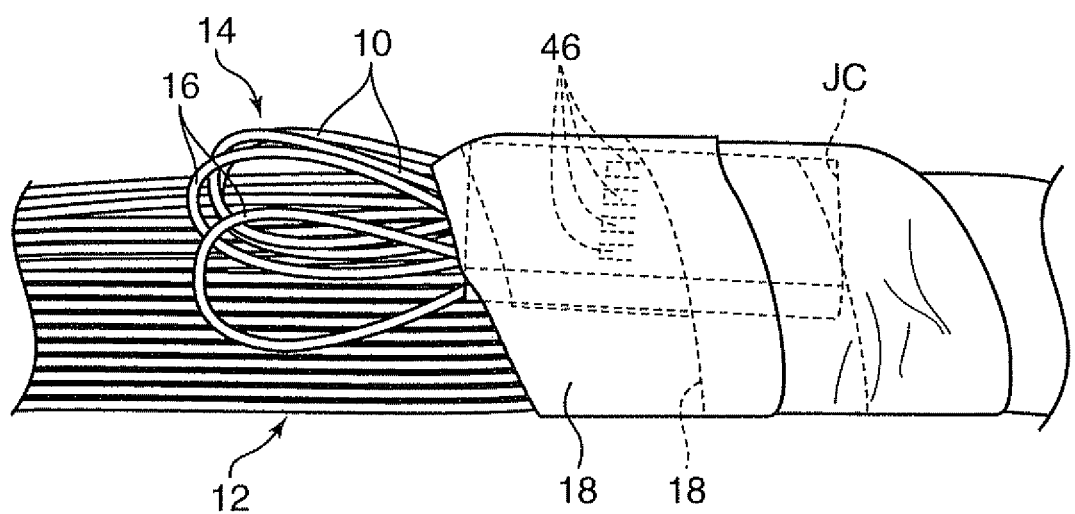
FIG. 14 is a perspective view showing a winding mode equivalent to that in FIG. 4.

In addition, the binding tape 18, if wound around the insulation housing 40 to cross and pass over all of the lances 46 formed in the bottom wall 42 as described above, can restrict the respective deflection of all of the lances 46 outward of the insulation housing 40. This keeps the wire terminals 20 and the respective electric contact portions 32 be fitted with each other, thus preventing the wire terminals 20 from dropping off from the joint connector JC. This effect can be obtained also in a winding mode as shown in FIG. 14 (a winding mode equivalent to that in FIG. 4).

The joint connector JC, though fixed onto the trunk line 12 with the bottom wall 42 formed with the lances 46 facing outward in the embodiment shown in the drawings, may be fixed onto the trunk line 12 so that the bottom wall 42 faces inward.

Alternatively, there may be a combined use of a first binding tape 18 and a second binding tape 19 as the binding tape, like a second winding mode shown in FIGS. 15 to 18.

The binding tape 18 is spirally wound around the electric wires 10 constituting the trunk line 12 to keep the electric wires bound. The binding tape 18 may be wound so as to cover the entire surface of the trunk line 12 as shown in FIG. 4, or so as to leave spaces each exposing a part of the trunk line 12.

Figure 15:
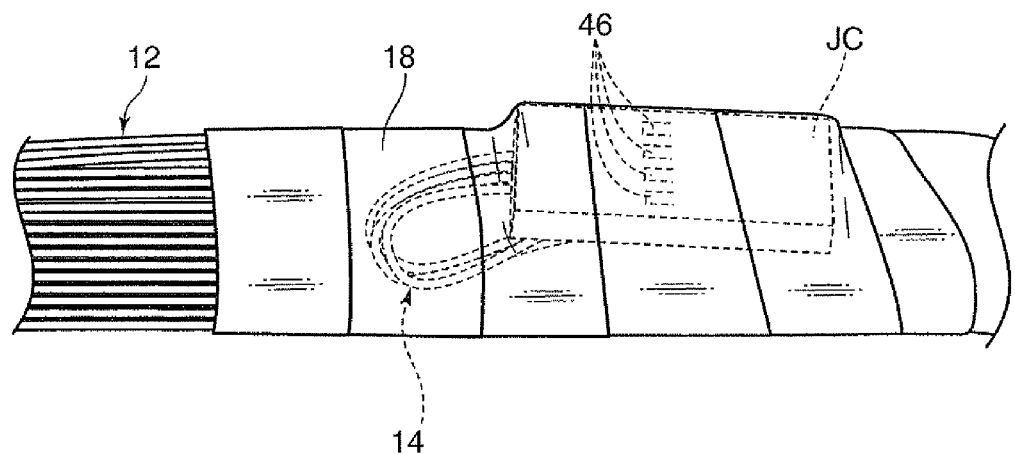
FIG. 15 is a perspective view showing a state of a first trunk-line tape having wound in a region where a joint-connector is setup on the trunk line, in a second winding mode.
Figure 16:
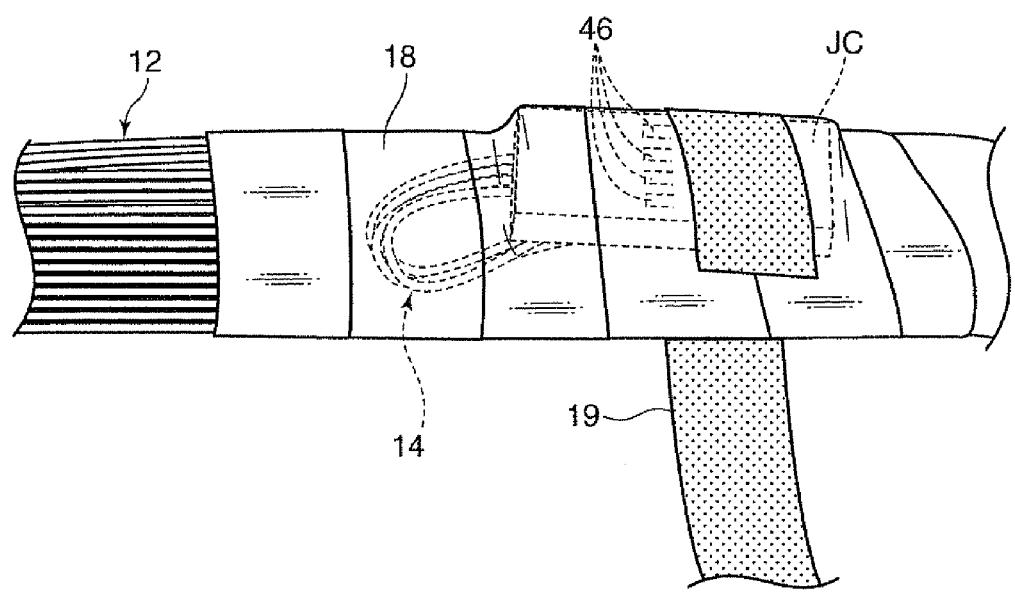
FIG. 16 is a perspective view showing a state of a second trunk-line tape placed on an outer surface of the first trunk-line tape.

In a location where the joint connector JC is set up, the first binding tape 18 is continuously wound across and around the joint connector JC and the branch wires 14 connected to the joint connector JC, and the trunk line 12, as shown in FIGS. 15 and 16. Herein, the first binding tape 18 is wound so as to cross and pass over all of the lances 46 formed in the bottom wall 42 of the insulation housing 40 of the joint connector JC.

Thus, keeping the trunk line 12 bound and fixing the joint connector JC onto the trunk line 12 can be efficiently performed by use of the first binding tape 18. However, the first binding tape 18, which is comprehensively wound across the trunk line 12 and the joint connector JC, let the joint connector JC be likely to be displaced with respect to the trunk line 12 circumferentially of the trunk line 12, inside the first binding tape 18.

Figure 17:
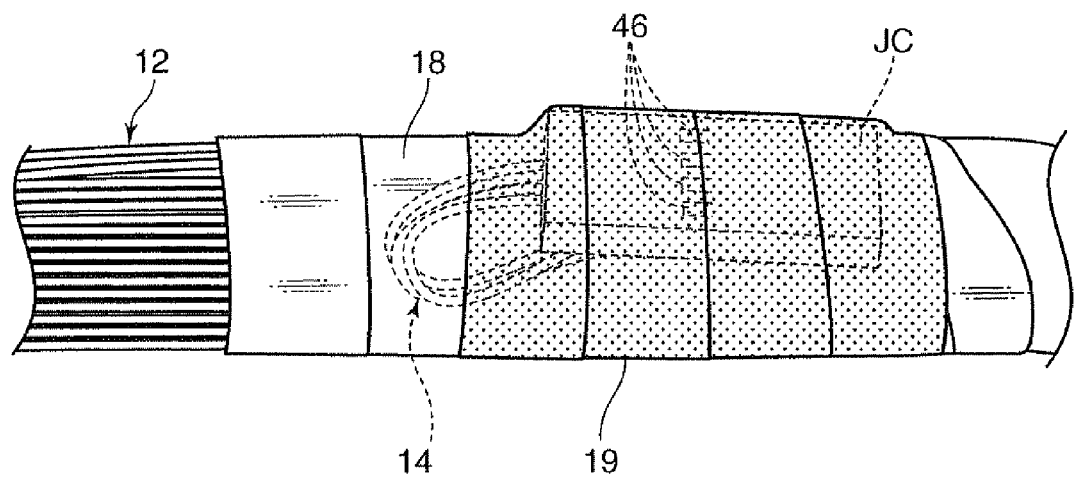
FIG. 17 is a perspective view showing a state of the joint connector having been fixed onto the trunk line by use of the first and second trunk-line tapes.
Figure 18:
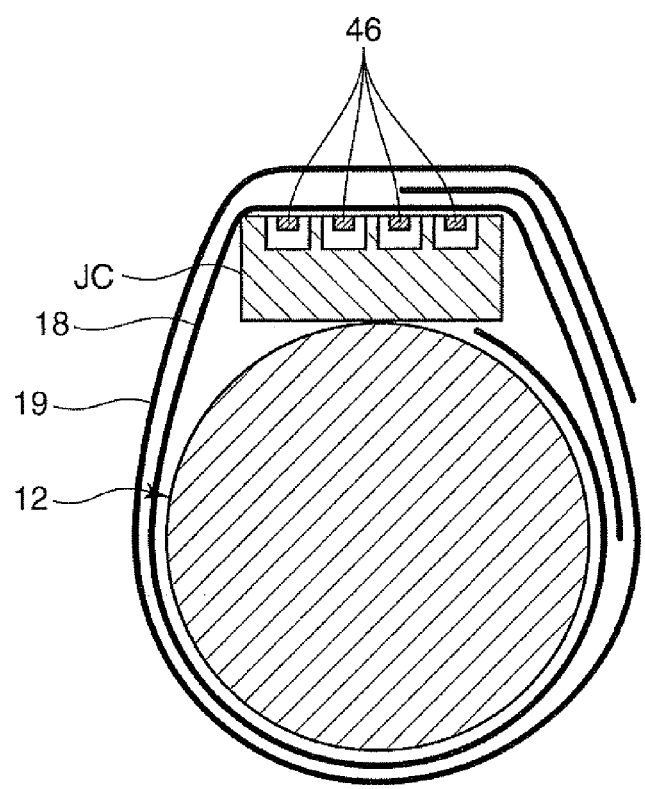
FIG. 18 is a cross-sectional view showing the state of the joint connector having been fixed onto the trunk line by use of the first and second trunk-line tapes.

In view of this, around the joint connector JC and the trunk line 12 with the first binding tape 18 wound therearound in the above manner, the second binding tape 19 is additionally wound, as shown in FIGS. 16 to 18, from outside of the first binding tape 18 continuously wound around the joint connector JC and the trunk line 12. The second binding tape 19 is wound around only the setup location of the joint connector JC on the trunk line 12. Specifically, the second binding tape 19 is wound from outside the first binding tape 18 in the joint-connector setup location on the trunk line for assisting tightening the joint connector JC onto the trunk line 12 in the location by the first binding tape.

Through the simple winding operation of thus winding the second binding tape 19 from outside of the first binding tape 18, the joint connector JC is efficiently fixed by use of the binding tapes 18 and 19. Besides, winding the second binding tape 19 only around the setup location of the joint connector JC as mentioned above makes it possible to effectively suppress the displacement of the joint connector JC with respect to the trunk line 12 while reducing an amount of the used second binding tape 19 and shortening a time for the tape winding operation.

In this winding mode, there is used a binding tape of color different from that of the first binding tape 18 as the second binding tape 19 (for example, the second binding tape 19 is red while the first binding tape 18 is green). Thus using the first binding tape 18 and the second binding tape 19 of different colors facilitates finding out the setup location of the joint connector JC in the wire harness 100 even when the joint connector JC is fully covered by the first and second binding tapes 18 and 19.

The present invention is, however, not limited to this; the first binding tape 18 and the second binding tape 19 may be the same type. In this case, the initial operation of continuously winding the first binding tape 18 across and around the trunk line 12 and the joint connector JC set up on the trunk line 12 and the additional operation of continuously winding the second binding tape 19 to suppress displacement of the joint connector JC from the initially wound state can be performed by use of a common binding tape, which enables the wire harness 100 to be produced by a simpler process.

Besides, the second binding tape 19 is wound from outside of the first binding tape 18 so as to cross and pass over all of the lances 46 formed in the bottom wall 42 of the insulation housing 40 of the joint connector JC on the lances 46, wherein, as mentioned above, the first binding tape 18 is also wound to so as to cross and pass over all of the lances 46 thereon. Each of the first binding tape 18 and the second binding tape 19 is, therefore, wound around the joint connector JC so as to across all of the regions where the lances 46 are formed respectively. The thus wound first and second binding tapes 18 and 19 reliably restrict all of the lances 46 from being deflected outward beyond the bottom wall 42. This keeps the respective wire terminals 20 and the electric contact portions 32 fitted with each other, thus preventing the wire terminals 20 from dropping off from the joint connector JC.

If one of the first binding tape 18 and the second binding tape 19 (preferably, the first binding tape 18) is wound so as to cross and pass over all of the lances 46, the wire terminals 20 and the respective electric contact portions 32 are kept fitted with each other and the wire terminals 20 is prevented from dropping off from the joint connector JC.

Both of the first and second binding tapes 18 and 19 cover the joint connector JC and the branch wires 14 from outside thereof to prevent them from direct contact with other member, thereby facilitating handling the wire harness 100. Particularly, the joint connector JC, which is additionally covered by the second binding tape 19 from outside of the first binding tape 18, is more reliably prevented from direct contact with other member.

In addition, since the first binding tape 18 is continuously wound across and around the joint connector JC and the trunk line 12, and the second binding tape 19 is additionally wound from outside the first binding tape 18 in the setup location of the joint connector JC on the trunk line 12, the joint connector JC is tightened to the trunk line 12 not only by the first binding tape 18 but also by the second binding tape 19, and thereby displacement of the joint connector JC with respect to the trunk line 12 in the circumferential direction of the trunk line 12 is suppressed. This prevents the joint connector JC from being displaced in the circumferential direction of the trunk line 12 to cause contact with other member.

Figure 19A:
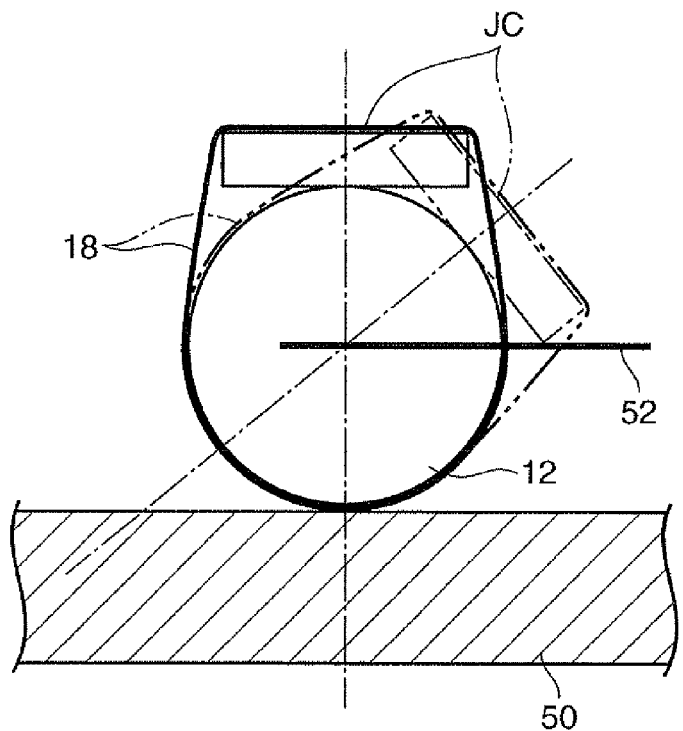
FIG. 19A shows a mode where only the first trunk-line tape has been continuously wound around the joint connector and the trunk line.

For example, under a condition that the trunk line 12 of the wire harness 100 is wired on a surface of a vehicle body 50 as shown in FIG. 19A, in the case of the wire harness 100 where the joint connector JC is fixed onto the trunk line 12 by simply winding the first binding tape 18 across and around the joint connector JC and the trunk line 12 continuously without winding the second binding tape 19, the joint connector JC can be displaced circumferentially of the trunk line 12 due to vehicle vibration or the like, and the displacement may bring the joint connector JC into contact with other member 52 of the vehicle body to cause abnormal noise or the like. In other words, according to this winding mode, the first binding tape 18 contributes to simplified structure and production process of the wire harness 100 by being used for both of keeping the electric wires 10 making up the trunk line 12 bound and fixing the joint connector JC onto the trunk line 12, while the joint connector JC is brought into a state of being intend to be displaced with respect to the trunk line 12 circumferentially of the trunk line 12, inside the first binding tape 18.

Figure 19B:
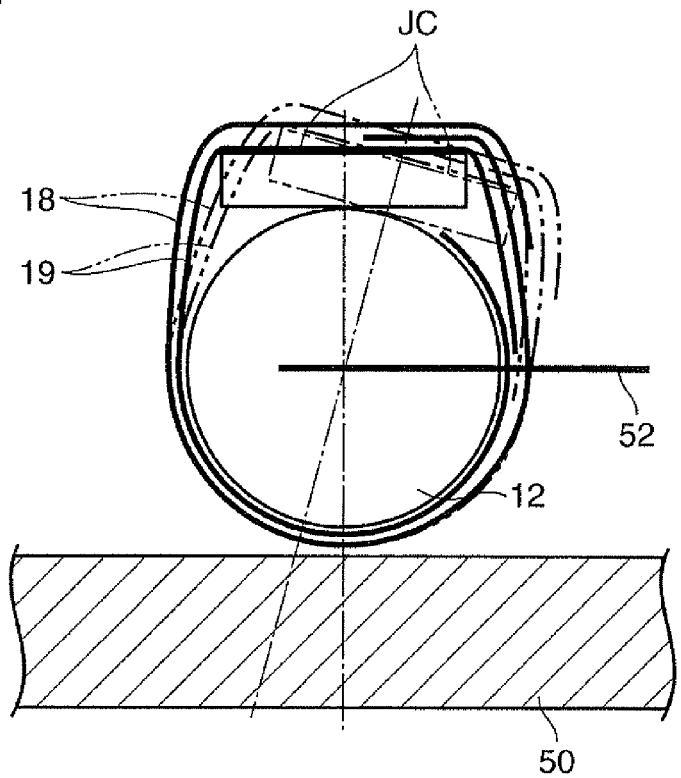
FIG. 19B shows the second winding mode.

In contrast, in the winding mode shown in FIG. 19B where the first binding tape 18 is continuously wound across and around the joint connector JC and the trunk line 12, and, in this state, the second binding tape 19 is additionally wound from outside of the first binding tape 18 around the joint connector JC and the trunk line 12, the first binding tape 18 wound around the joint connector JC and the second binding tape 19 additionally wound around an outer surface of the first binding tape 18 can tighten the joint connector JC fast to thereby suppress the displacement of the joint connector JC in the circumferential direction, thus preventing the joint connector from contact with other member 52.

Figure 20:
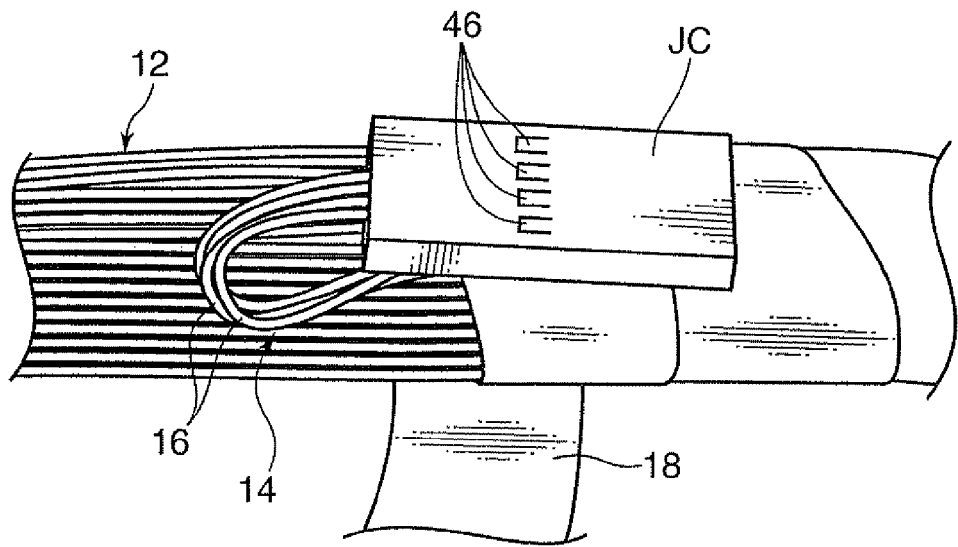
FIG. 20 is a perspective view showing a state of a trunk-line tape having wound in the region where the joint-connector is setup on the trunk line, in a third winding mode.
Figure 21:
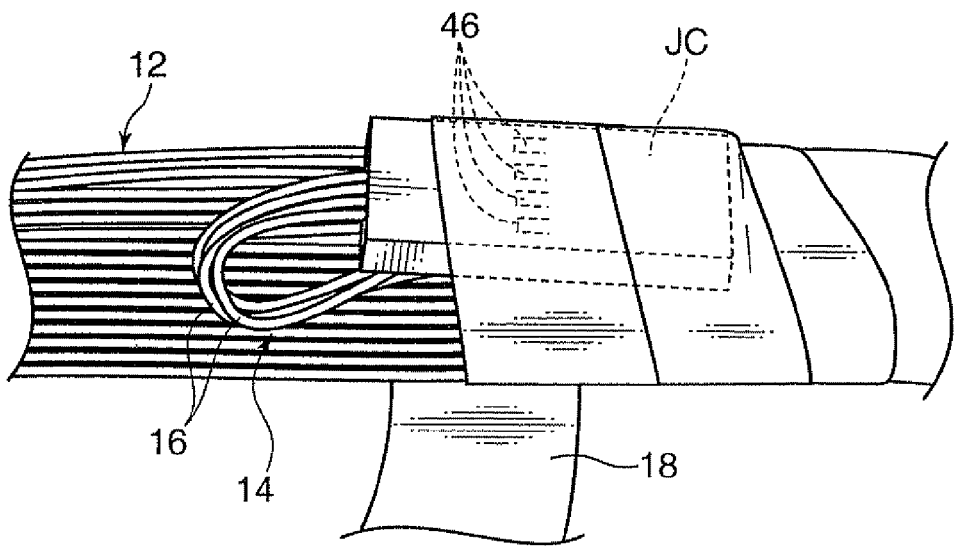
FIG. 21 is a perspective view showing a state of the joint connector having been fixed onto the trunk line by use of the trunk-line tape in the third winding mode.
Figure 22:
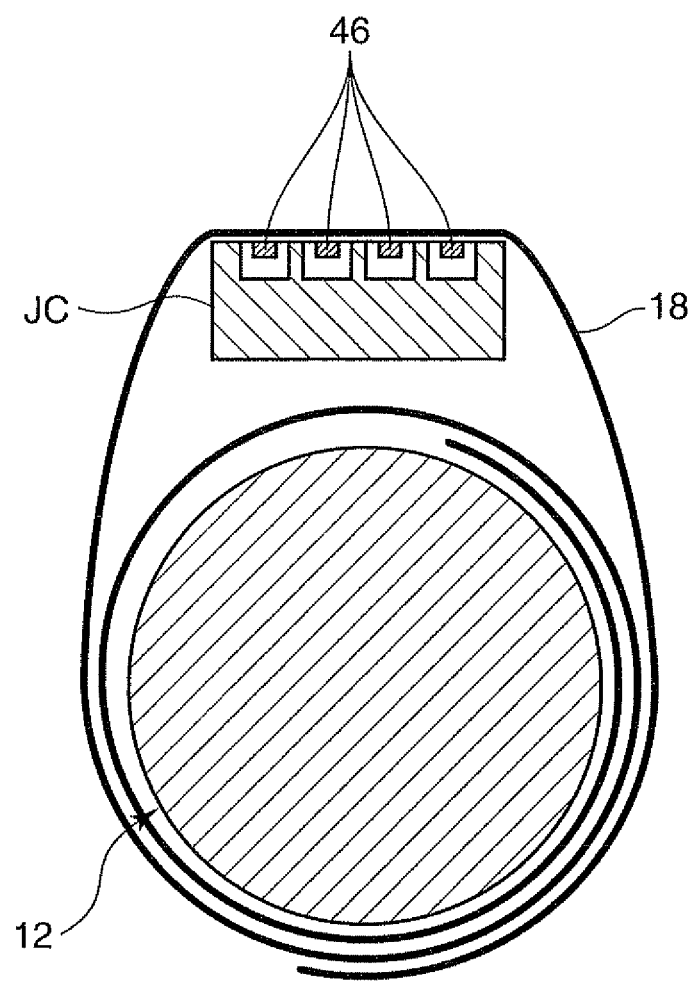
FIG. 22 is a cross-sectional view showing the state of the joint connector having been fixed onto the trunk line by use of the trunk-line tape in the third winding mode.

Alternatively, there may be employed a third winding mode as shown in FIGS. 20 to 22.

In this mode, there is spirally wound a binding tape 18 around the electric wires 10 constituting the trunk line 12 so as to keep the electric wires 10 bound. The binding tape 18 may be wound so as to cover the entire surface of the trunk line 12 as shown in FIGS. 20 and 21, or so as to leave spaces each exposing a part of the trunk line 12.

Following the arrival of the winding of the binding tape 10 at the setup location of the joint connector JC, the joint connector JC to which the branch wires 14 has connected as described above is set up on the trunk line 12 around which the binding tape 18 has been wound, involving folding the branch wires 14. Specifically, in this winding mode, as shown in FIG. 20, after the arrival of the winding of the binding tape 10 at the branch starting position 15 of the branch wires 14, the joint connector JC is set up on a location where the binding tape 18 has been already wound in the vicinity of the branch starting position 15 of the branch wires 14, while the intermediate portion 16 of the branch wire 14 is so folded as to bulge in a direction along the trunk line 12. In this operation, the joint connector JC is set up in such a posture that the bottom wall 42, which is formed with the lances 46, of the insulation housing 40 faces oppositely to the trunk line 12.

The branch wires 14 thus folded has a slack portion, which is shorter than an original wire of the branch wire 14 (in this embodiment, about one-half of the original wire). This facilitates the after-mentioned operation of winding the binding tape 18 around the slack portion. In addition, the branch wires 14 folded as described above are compact, and the slack of the branch wires 14 which the folding gives protects the connection region between the joint connector JC and each of the branch wires 14 from a large tensile force.

The joint connector JC may be set up so as to make the bottom wall 42 of the insulation housing 40 face toward the trunk line 12. According to the joint connector JC thus set up and fixed onto the trunk line 12, the outward deflection of the lances 46 is restricted by a peripheral surface of the trunk line 12, so that the wire terminals 20 is prevented from drop-off. The setup of the joint connector JC may be performed, for example, by simply pressing the joint connector JC with operator's fingers or the like until a subsequent tape winding operation, or may involve temporarily fastening the joint connector JC by use of an adhesive tape or the like. Furthermore, the joint connector JC may be set up so as to let a part thereof protrude beyond the binding tape 18 (see FIG. 20).

Successively following the setup of the joint connector JC onto the binding tape 18 in the above manner, the binding tape 18 onto which the joint connector JC placed is continuously wound, as shown in FIG. 3, across and around the joint connector JC and the trunk line 12 around which the binding tape 18 has been already wound. Thus, the joint connector JC is efficiently fixed by use of the binding tape 18.

In this operation, the binding tape 18 is continuously wound so as to pass over all of the lances 46 formed in the bottom wall 42 of the insulation housing 40 of the joint connector JC. The thus wound binding tape 18 restricts the deflection of all of the lances 46 beyond the bottom wall 42, thereby keep the wire terminals 20 fitted with the electric contact portions 32 to prevent the wire terminals 20 from dropping off from the joint connector JC.

The joint connector JC and the branch wires 14 fixed to the trunk line 12 as described above are covered by the binding tape 18 from outside thereof to be prevented from direct contact with other member, which facilitates handling the wire harness 100.

In addition, since the joint connector JC is provided on the binding tape 18 wound around the trunk line 12 and thereafter the binding tape 18, on which the binding tape 18 has been already placed thereon, is successively wound across and around the joint connector JC and the trunk line 12 around which the binding tape 18 has been already wound continuously, a contact area between the joint connector JC and the binding tape 18 is increased. Furthermore, the binding tape 18 tightens the joint connector JC to suppress the displacement of the joint connector JC in a circumferential direction of the trunk line 12. Specifically, the binding tape 18 is tightly wound so as to vertically sandwich the joint connector JC to tighten the joint connector JC onto the trunk line 12, thus increasing a frictional force against a displacement of the joint connector JC in the circumferential direction of the trunk line 12, and thereby the displacement in the circumferential direction is suppressed. This results in a prevention of the joint connector JC from contact with other member due to the displacement in the circumferential direction of the trunk line 12.

Figure 23:
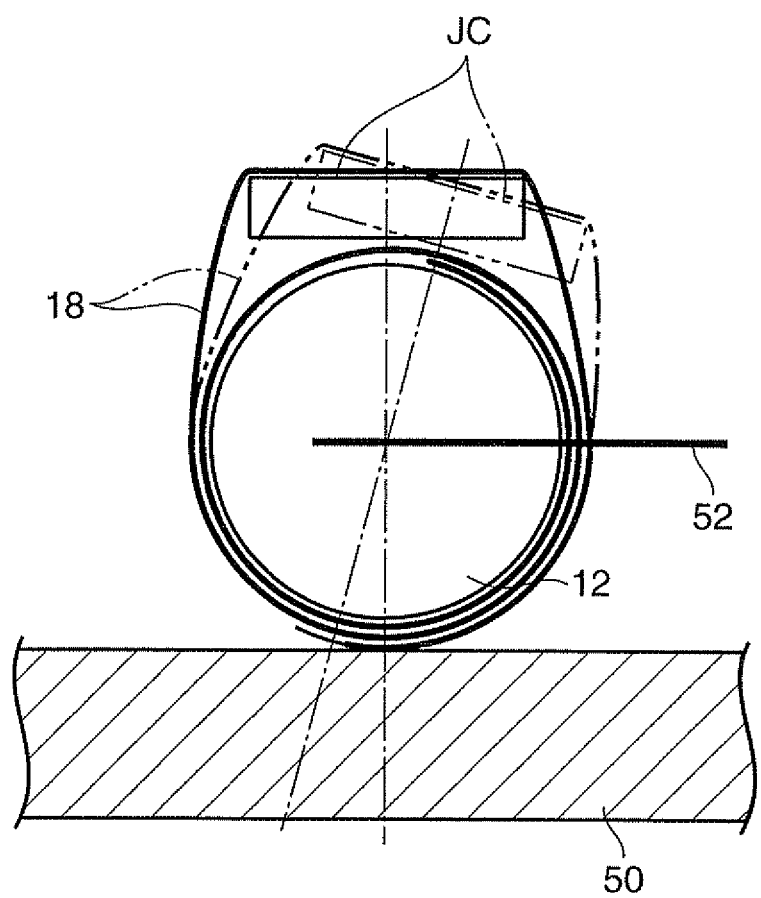
FIG. 23 shows a state of a use of the wire harness in the third winding mode.

More specifically, according to the third winding mode shown in FIG. 22, the binding tape 18 is firstly wound around the trunk line 12 in the setup location of the joint connector JC, thus tightening the trunk line 12, that is, the bundle of electric wires 10 to thereby restrict a movement of each of the electric wires 10; this stabilizes the shape of the trunk line 12. The thus stabilized shape of the trunk line 12 fast allows the binding tape 18 to be tightly wound because, the joint connector JC is placed on the trunk line 12 having the stabilized shape and the binding tape 18 is continuously wound across and over the joint connector JC and the trunk line 12 of the stabilized shape. This enables the joint connector JC to be tightened onto the trunk line 12 by the binding tape 18. In addition, because the joint connector JC having the flattened outer shape is sandwiched by the binding tape 18 from the sides of the top wall 41 and the bottom wall 42 thereof, a contact area between the joint connector JC and the binding tape 18 is increased. This allows the frictional force caused in the contact region when the joint connector JC is urged to be displaced in the circumferential direction of the trunk line 12 to be increased to a level enough to suppress the displacement of the joint connector JC in the circumferential direction. Therefore, even if the trunk line 12 of the wire harness 100 is wired on a surface of a vehicle body 50 as shown in FIG. 23, the binding tape 18 suppresses the displacement of the joint connector JC in the circumferential direction of the trunk line 12 due to the vehicle vibration or the like, thereby preventing the joint connector JC from contact with other member 52.

(Overview of the Inventions)

As described above, the present invention provides a wire harness capable of forming a short circuit by use of a plurality of electric wires and a joint connector while establishing slenderizing and weight reduction thereof, and provides a method of producing the wire harness by a simple process.

A wire harness according to the present invention comprises a plurality of circuit modules forming respective short circuits and a binding tape for binding the circuit modules together in a bundle, each of the circuit modules including: a plurality of electric wires; a plurality of external-connection connectors connected to respective first ends of the electric wires; and a joint connector connected to respective second ends of the electric wires to short-circuit the second ends. The electric wires constituting the circuit modules are bundled together in such a manner that the joint connector of each of the circuit modules is positioned in a vicinity of at least one of the external-connection connectors included in the circuit module, and the binding tape is wound around the bundled electric wires.

In this wire harness, since the electric wires are wired in such a manner that the joint connector included in each of the circuit modules is positioned in the vicinity of at least one of the external-connection connectors included in the circuit module and the binding tape is wound around the bundled electric wires, it is possible to reduce a wire length between each of the external-connection connectors and the joint connector in the circuit module and thereby achieve slenderizing and weight reduction of the wire harness.

Particularly, in the case of the wire harness where the electric wires constituting the circuit modules are bundled together to form a trunk line, from which the respective ends of the electric wires included in a common one of the circuit modules are extracted from the trunk line to form a plurality of branch wires, to the ends of which the respective joint connectors are commonly connected, and the binding tape is continuously wound across and around the joint connector to thereby fix the branch wires and the trunk line, the use of the binding tape for fixing the joint connector simplifies a tape winding operation for producing the wire harness. Furthermore, since the joint connector and the branch wires connected to the joint connector are received inside the binding tape together with the trunk line, structural simplification and slenderizing the wire harness is further advanced, as compared with a wire harness where the joint connector and the branch wires connected to the joint connector diverge and extend outside the binding tape.

As the joint connector, preferable is one which comprises: a short-circuiting metal plate formed of a single metal plate and including a plurality of fitting portions to be fitted with respective wire terminals provided at the ends of the branch wires so as to short-circuit the branch wires in the fitted state; and an insulation housing holding the short-circuiting metal plate and having an outer shape flattened in a thickness direction of the short-circuiting metal plate. When this joint connector is fixed onto the trunk line in such a posture that the short-circuiting metal plate is approximately perpendicular to a radial direction of the trunk line, the size of the part of the joint connector protruding beyond the trunk line is further decreased, and thus the entire wire harness is further slenderized.

In this case, a preferable ratio of a width dimension of the joint connector to a diameter of the trunk line is 0.8 or less. This dimensional ratio allows the joint connector to be stably fixed onto the trunk line while suppressing the widthwise protrusion of the joint connector beyond the trunk line. The suppression of the protrusion of the joint connector can contribute to prevention of a negative effect due to contact of the joint connector with other member, such as occurrence of abnormal noise due to vehicle vibration.

As means for realizing the slenderizing and weight reduction of the wire harness of the present invention, contemplated is to use, instead of a copper-based electric wire (an electric wire comprising a conductor made of copper or a copper allow) which has heretofore been widely used, a composite electric wire having strands a part of which is made of stainless steel having higher strength than that of copper or a copper alloy to slenderize the wire, or an aluminum-based electric wire comprising a conductor made of aluminum or an aluminum alloy having a specific gravity less than that of copper or an copper alloy. However, the composite electric wire or the aluminum-based electric wire, that is, a non-copper based electric wire, has been rarely used, particularly, in vehicle wire harnesses, because of severe restrictions in use. Specifically, the composite electric wire is hard to use in a region having a high required voltage, because of its resistance greater than that of the copper-based electric wire. The aluminum-based electric wire is extremely hard to use in a region to be exposed to rain water or the like, and a region forcedly bent, because aluminum or an aluminum alloy forming the conductor of the aluminum-based electric wire is rust-prone and has a low strength.

In this regard, at least one of the circuit modules may be designed such that: the joint connector thereof includes a short-circuiting conductor fittable with a plurality of wire terminals attached to respective second ends of the electric wires; and the electric wires includes a combination of a copper-based electric wire comprising a conductor made of copper or a copper alloy and a non-copper based electric wire comprising a conductor made of a material other than copper and a copper alloy and having a weight per unit length and a diameter at least one of which is less than that of the copper-based electric wire, the electric wires being short-circuited to each other through a common one of the joint connectors. This enables the wire harness to be slenderized and reduced in weight by use of the non-copper based electric wire while avoiding the restrictions imposed on the non-copper based electric wire.

Specifically, in the case of using, as the non-copper based electric wire, a composite electric wire of small diameter, the composite electric wire comprising a conductor including a strand made of copper or a copper alloy and a strand made of stainless steel, the composite electric wire may be wired only in a region of a low required voltage (i.e., a region where the composite electric wire is not required to have a low resistance), and a low-resistance copper-based electric wire may be wired in other region having a high required voltage; this allows the composite electric wire to be used while avoiding the restriction in terms of voltage, thereby achieving slenderizing the wire harness.

Alternatively, in the case of using, as the non-copper based electric wire, a lightweight (low in weight per unit length) aluminum-based electric wire which comprises a conductor made of aluminum or an aluminum alloy, for example, the aluminum-based electric wire may be wired only in a region which is less likely to be exposed to rain water or the like and a region which is less likely to be subjected to bending, and the copper-based electric wire may be wired in other region; this allows the aluminum-based electric wire to be used while avoiding the restrictions in terms of antirust and strength, thereby achieving slenderizing the wire harness.

Furthermore, in spite of the electric wires included in the circuit module different in material from each other, attaching a plurality of wire terminals to respective ends of the electric wires and fitting the wire terminals with the short-circuiting conductor of the common joint connector enables the electric wires to be short-circuited to each other without any problem.

In the case that the branch wires are extracted from the trunk line, it is preferable that: the joint connector is set up on the trunk line while each of the branch wires is folded so as to have an intermediate portion bulging out from a branch starting position of the branch wire in a direction along the trunk line; and the binding tape is continuously wound across and around the joint connector to thereby fix the joint connector onto the trunk line.

In this wire harness, since the joint connector is fixed onto the trunk line under the condition that the intermediate portion of each of the branch wires bulges in the direction along the trunk line, namely, in a folding state, a bulging length of each of the branch wires from the trunk line can be decreased. In addition, the use of the binding tape for fixing the branch wires and the joint connector simplifies the tape winding operation for producing the wire harness, and the binding tape wound around the joint connector can prevent the joint connector from direct contact with other member. Furthermore, each of the branch wires has a slack portion which protects a connection region between the joint connector and each of the branch wires from a large tensile force.

Particularly, in the case of the wire harness where the joint connector is fixed in a vicinity of the branch starting position of each of the branch wires of the wire harness, a length of the bulging portion of each of the branch wires can be shorten to about one-half of an overall length of the branch wire.

As to the binding tape, it preferably has a first portion wound around the joint connector at least one turn and a second portion continuously wound across and around the joint connector around which the first portion has been already wound and the trunk line to thereby fix the joint connector onto the trunk line, continuously.

In this wire harness, fixing the joint connector onto the trunk line allows the bulging length of each of the branch wires from the trunk line to be reduced, and further utilizing the binding tape to keep the trunk line bound also for fixing the joint connector simplifies the tape winging operation for producing the wire harness and allows the binding tape wound around the joint connector to prevent the joint connector from direct contact with other member. In addition, the binding tape, consecutively following at least one turn around the joint connector, is continuously wound across and around the joint connector around which the binding tape has been already wound and the trunk line, thereby suppressing the displacement of the joint connector with respect to the trunk line in a circumferential direction of the trunk line. This results in a prevention of the joint connector from contact with other member due to the displacement in the circumferential direction of the trunk line.

In this case, it is preferable that the branch wires are placed on the trunk line so as to extend along a surface of the trunk line, and the binding tape is continuously wound across and around the branch wire and the trunk line. In this wire harness, where the branch wires are also fixed onto the trunk line by the binding tape, the bulging length of each of the branch wires from the trunk line can be reduced, and the binding tape prevents the branch wires from direct contact with other member. These facilitate handling the wire harness.

In this wire harness, it is more preferable that: the joint connector comprises a short-circuiting metal plate formed of a single metal plate and including a plurality of fitting portions capable of being fitted with respective wire terminals provided at the ends of the branch wires to short-circuit the branch wires, and an insulation housing which includes a plurality of terminal-receiving chambers into which the respective wire terminals can be inserted to be fitted with the respective fitting portions and having an outer shape flattened in a thickness direction of the short-circuiting metal plate so that the terminal-receiving chambers are arranged side-by-side along the short-circuiting metal plate at positions corresponding to the respective fitting portions; the insulation housing has a wall portion which is located on one side in the thickness direction to delimit a bound between each of the terminal-receiving chambers and an outside thereof, the wall portion formed with a plurality of terminal-locking portions at respective positions corresponding to the terminal-receiving chambers, each of the terminal-locking portions adapted to be deflected outwardly beyond an outer surface of the insulation housing, when each of the wire terminals is inserted into corresponding one of the terminal-receiving chambers to permit the wire terminal to pass therethrough, and, after the passing, return to a normal position to lock the wire terminal in a position where the wire terminal is fitted with corresponding one of the fitting portions; and the joint connector is fixed onto the trunk line in such a posture that the short-circuiting metal plate is approximately perpendicular to a radial direction of the trunk line in a state where the binding tape is already wound around the insulation housing so as to cross all of regions where the terminal-locking portions are formed respectively.

In this wire harness, fixing the joint connector onto the trunk line allows the bulging length of each of the branch wires from the trunk line to be reduced.

The joint connector according to the present invention can be prevented from direct contact with other member also by first and second binding tapes. Specifically, the first binding tape is wound around the electric wires constituting the trunk line, and, in a joint-connector setup location on the truck line, continuously wound across and around the joint connector and the trunk line, thus serving as both of a means to keep the electric wires constituting the trunk line bound and a means to fix the joint connector onto the trunk line, thereby contributing to simplified structure and production process of the wire harness. Although the first binding tape allows the joint connector to be likely to be displaced with respect to the trunk line in the circumferential direction of the trunk line, inside the first binding tape, the second binding tape is wound, in addition to the first binding tape, from outside of the first binding tape in the joint-connector setup location on the trunk line, thus tightening the joint connector onto the trunk line in addition to tightening by the first binding tape. This suppresses the displacement of the joint connector in the circumferential direction of the trunk line.

Furthermore, this wire harness, where the first and second binding tape are required only to be simply wounded, involves less increment in volume than that of a conventional wire harness where a branch-wire tape is wound around the branch wires in addition to the binding tape.

The second binding tape is, preferably, different in color from the first binding tape. The difference in color facilitates visually checking the joint-connector setup location in the wire harness even if the joint connector is fully covered by the first and second binding tapes.

In the wire harness including the short circuit according to the invention, it is preferable that: the joint connector is set up on the trunk line while each of the branch wires are folded so as to have an intermediate portion bulging out from a branch starting position of the branch wire in a direction along the trunk line; and the first binding tape is continuously wound across and around the branch wire and the trunk line.

The intermediate portion of each of the branch wires which portion bulges in a direction along the trunk line, i.e., a slack portion, prevents the connection region between the joint connector and each of the branch wires from being subject to a large tensile force. Besides, since the branch wires are also fixed onto the trunk line by the first binding tape, the bulging length of each of the branch wires from the trunk line is decreased, and the first binding tape wound around the branch wires prevents the branch wires from direct contact with other member. This facilitates handling the wire harness.

It is preferable that: the joint connector comprises a short-circuiting metal plate formed of a single metal plate and including a plurality of fitting portions capable of being fitted with respective wire terminals provided at the ends of the branch wires to short-circuit the branch wires, and an insulation housing which includes a plurality of terminal-receiving chambers into which the respective wire terminals can be inserted to be fitted with the respective fitting portions and having an outer shape flattened in a thickness direction of the short-circuiting metal plate so that the terminal-receiving chambers are arranged side-by-side along the short-circuiting metal plate at positions corresponding to the respective fitting portions; the insulation housing has a wall portion which is located on one side in the thickness direction to delimit a bound between each of the terminal-receiving chambers and an outside thereof, the wall portion formed with a plurality of terminal-locking portions at respective positions corresponding to the terminal-receiving chambers, each of the terminal-locking portions adapted to be deflected outwardly beyond an outer surface of the insulation housing, when each of the wire terminals is inserted into corresponding one of the terminal-receiving chambers to permit the wire terminal to pass therethrough, and, after the passing, return to a normal position to lock the wire terminal in a position where the wire terminal is fitted with corresponding one of the fitting portions; the joint connector is placed onto the trunk line in such a posture that the short-circuiting metal plate is perpendicular to a radial direction of the trunk line; and both of the first and second binding tapes are wound so as to cross all of regions where the terminal-locking portions are formed respectively.

While the terminal-locking portions are typically formed inside the insulation housing, the present invention includes forming the terminal-locking portions in the outer wall, which allows the outer shape of the insulation housing to be a flattened and thin shape, thus enabling the protruding size of the insulation housing from the trunk line to be decreased.

In addition, the restriction of the outward deflection of the terminal-locking portions by utilization of the first and second binding tapes ensures the lock by the terminal-locking portions. Although the terminal-locking portions are capable of locking the respective wire terminals even if not being restricted from the outward deflection by a binding tape, the fitting each of the wire terminals with the fitting portion can be more reliably maintained by the utilization of the first binding tape and the second binding tape, and thereby the wire terminals are reliably prevented from pull-out from the joint connector.

Besides, the insertion of the wire terminals attached to respective ends of the branch wires into respective ones of the terminal-receiving chambers of the insulation housing to make the wire terminals be fitted with corresponding ones of the fitting portions of the short-circuiting conductor enables the wire terminals to be short-circuited to each other through the short-circuiting conductor. Furthermore, fixing the joint connector onto the trunk line in such a posture that the short-circuiting metal plate of the joint connector is approximately perpendicular to a radial direction of the trunk line allows the joint connector to protrude beyond the trunk line in a suppressed small dimension, which promoters slenderizing the entire wire harness.

The above binding tape may continuously include a first portion which is wound around the trunk line and a second portion which is continuously wound across and around the first portion and the joint connector placed on the first portion to thereby fix the joint connector onto the trunk line.

In this wire harness, fixing the joint connector onto the trunk line allows a bulking length of each of the branch wire from the trunk line to be reduced. In addition, utilizing the binding tape for fixing the joint connector simplifies the tape winding operation for producing the wire harness, and the binding tape wound around the joint connector prevents the joint connector from direct contact with other member.

Furthermore, since the joint connector is set up on the trunk line so as to be placed on the binding tape wound around the trunk line and, consecutively following the placement of the joint connector, the binding tape on which the joint connector is placed is continuously wound across and around the joint connector and the trunk line around which the binding tape has been already wound, there can be increased a contact area between the joint connector and the binding tape and the joint connector can be tightened by the binding tape, and thereby the displacement of the joint connector in a circumferential direction of the trunk line is suppressed. Specifically, the binding tape, tightly wound around the trunk line so as to sandwich the joint connector vertically, increases a frictional force against the displacement of the joint connector in the circumferential direction of the trunk line, thereby suppressing the displacement. This results in preventing the joint connector from contact with other member due to the displacement thereof in the circumferential direction of the trunk line.

Also in this wire harness, it is preferable that: the joint connector is set up on the trunk line while each of the branch wires is folded so as to have an intermediate portion bulging out from a branch starting position of the branch wire in a direction along the trunk line; and the binding tape is continuously wound across and around the joint connector.

It is preferable that: the joint connector comprises a short-circuiting metal plate formed of a single metal plate and including a plurality of fitting portions capable of being fitted with respective wire terminals provided at the ends of the branch wires to short-circuit the branch wires, and an insulation housing which includes a plurality of terminal-receiving chambers into which the respective wire terminals can be inserted to be fitted with the respective fitting portions and having an outer shape flattened in a thickness direction of the short-circuiting metal plate so that the terminal-receiving chambers are arranged side-by-side along the short-circuiting metal plate at positions corresponding to the respective fitting portions; the insulation housing has a wall portion which is located on one side in the thickness direction to delimit a bound between each of the terminal-receiving chambers and an outside thereof, the wall portion formed with a plurality of terminal-locking portions at respective positions corresponding to the terminal-receiving chambers, each of the terminal-locking portions adapted to be deflected outwardly beyond an outer surface of the insulation housing, when each of the wire terminals is inserted into corresponding one of the terminal-receiving chambers to permit the wire terminal to pass therethrough, and, after the passing, return to a normal position to lock the wire terminal in a position where the wire terminal is fitted with corresponding one of the fitting portions; and the joint connector is fixed onto the trunk line in such a posture that the short-circuiting metal plate is approximately perpendicular to a radial direction of the trunk line by the binding tape which is wound so as to cross all of regions where the terminal-locking portions are formed respectively in a state that the joint connector is placed, in such a posture that the wall portion formed with the terminal lock portion faces oppositely to the trunk line and the short-circuiting metal plate is approximately perpendicular to the radial direction of the trunk line on the binding tape which is already wound around the trunk line.

In this case, though the joint connector is placed, in a posture where the wall portion formed with the terminal-locking portions faces oppositely to the trunk line, on the binding tape wound around the trunk line, the terminal-locking portions still can lock the wire terminals. The binding tape, wound across and around the joint connector and the trunk line around which the binding tape has been already wound so as to cross all of the positions where the terminal-locking portions are formed respectively, further restricts the terminal-locking portions to be outward deflected beyond an outer surface of the insulation housing. This maintains the wire terminals be fitted with the respective fitting portions, thus more reliably preventing the wire terminals from dropout from the joint connector.

Besides, the wire terminals attached to respective ends of the branch wires can be short-circuited to each other through the short-circuiting conductor by the insertion of the wire terminals into the respective terminal-receiving chambers of the insulation housing to fit the wire terminals with the respective fitting portions of the short-circuiting conductor. Furthermore, fixing the joint connector onto the trunk line in such a posture that the short-circuiting metal plate is approximately perpendicular to a radial direction of the trunk line allows the joint connector to protrude from the trunk line in a suppressed small dimension, which promotes slenderizing the entire wire harness.

The present invention further provides a method for producing a wire harness which comprises a plurality of circuit modules for forming a plurality of short circuits respectively, each of the circuit modules including a plurality of electric wires, a plurality of external-connection connectors connected to respective first ends of the electric wires; and a joint connector connected to respective second ends, the ends opposite to first ends, of the electric wires to short-circuit the second ends of the electric wires. The method comprises: a trunk-line forming step of bundling the electric wires included in the circuit modules to thereby form a trunk line; an external-connection-connector connecting step of connecting the external-connection connector to the first end of each of the electric wires, before or after the trunk-line forming step; a joint-connector connecting step of connecting the joint connector commonly to the second ends of the electric wires included in a common one of the circuit modules to short-circuit the second ends, before or after the trunk-line forming step; and a step of winding a binding tape around the electric wires constituting the trunk line to keep the electric wires bound and continuously winding the binding tape across and around the joint connector and the trunk, in a joint-connector setup location on the trunk line, to thereby fix the joint connector onto the trunk line, following completion of the aforementioned steps. Moreover, the trunk-line forming step includes wiring the electric wires included in each of the circuit modules in such a manner that the joint connector to be connected to the second ends of the electric wires of the circuit module through the joint-connector connecting step is positioned in a vicinity of at least one of the external-connection connectors included in the circuit module.

This method, involving wiring the electric wires so as to position the joint connector included in each of the circuit modules in the vicinity of at least one of the external-connection connectors included in the circuit module, allows the wire length required between each of the external-connection connectors and the joint connector in the circuit module to be decreased, thereby achieving slenderizing and weight reduction of the wire harness. Furthermore, the binding tape is wound in a state that the circuit modules are bundled together, while, in each of the joint-connector setup locations, winding of the binding tape to the trunk line and fixing of the joint connector to the trunk line are continuously and efficiently performed.

In this method, each of the connector connecting steps may be performed either before or after the trunk-line forming step. The joint-connector connecting step may includes: extracting specific ones of the electric wires included in the trunk line formed through the trunk-line forming step, as a plurality of branch wires; connecting the joint connector to respective ends of the branch wires to short-circuit the branch wires; winding the binding tape, in the joint-connector setup location, across and around the joint connector, the branch wires connected to the joint connector, and the trunk line continuously, to thereby fix the joint connector onto the trunk line. In this case, extracting the electric wires included in the same circuit module, as branch wires, from the trunk line previously formed through the trunk-line forming step allows the short-circuiting of the electric wires to be efficiently performed, and the branch wires and the joint connector can be efficiently fixed by use of the binding tape to be wound around the trunk line.

It is preferable that: the trunk-line forming step includes an use of a combination of a copper-based electric wire comprising a conductor made of copper or a copper alloy and a non-copper based electric wire comprising a conductor made of a material other than copper and a copper alloy and having a weight per unit length and a diameter at least one of which is less than that of the copper-based electric wire, as the electric wires included in at least one of the circuit modules; and the joint-connector connecting step includes attaching a plurality of wire terminals to the respective second ends of the copper-based and non-copper based electric wire; and fitting the wire terminals with a short-circuiting conductor included in the joint connector and adapted to be fitted with the wire terminals to thereby short-circuit the second ends of the electric wires. This method, involving the combined use of the copper-based electric wire and the non-copper based electric wire for at least one of the circuit modules, enables the wire harness to be slenderized or brought into weight reduction, by the use of the non-copper based electric wire. In addition, the copper-based electric wire and the non-copper based electric wire, though having different conductors in material, can be short-circuited to each other without any problem, through the wire terminals attached to respective ends of the electric wires and the joint connector including the short-circuiting conductor fittable with the wire terminals. Furthermore, the binding tape is wound around the circuit modules bundled together, and, in each of the joint-connector setup locations, winding of the binding tape to the trunk line and fixing of the joint connector to the trunk line are continuously and efficiently performed.

In the method of the present invention, the joint connector is preferably set up on the trunk line while each of the branch wires is folded so as to have an intermediate portion bulging out from a branch starting position of the branch wire in a direction along the trunk line, and, in this state, fixed onto the trunk line by the binding tape continuously wound across and around the joint connector, the branch wires and the trunk line. This method allows, in addition to the collective and efficient performance of winding the binding tape around the trunk line and fixing the joint connector to the trunk line, an easy operation of winding the binding tape around the branch wires, because the intermediate portion of each of the branch wires between the joint connector and the trunk line is folded so as to bulge out from the branch starting position of the branch wire in the direction along the trunk line.

The binding tape is preferably wound, consecutively following at least one turn around the joint connector in the joint-connector setup location, across and around the joint connector around which the binding tape has been already wound and the trunk line continuously to thereby fix the joint connector onto the trunk line. This method allows, in addition to the collective and efficient performance of winding the binding tape around the trunk line and fixing the joint connector to the trunk line, a production of a wire harness in which the joint connector fixed onto the trunk line is hard to displace in the circumferential direction of the trunk line, through an easy operation, for fixing the joint connector onto the trunk line, of winding the binding tape around the joint connector and thereafter continuously winding the binding tape around the joint connector and the trunk line.

As the binding tape, there may be used a first binding tape and a second binding tape: the first binding tape is wound around the electric wires constituting the trunk line to keep the electric wires bound and, in a setup location of the joint connector, continuously wound across and around the joint connector and the trunk line, while the second binding tape is wound from outside of the first binding tape in a setup location of the joint connector on the trunk line in order to assist tightening the joint connector onto the trunk line by the first binding tape.

This method enables winding the first binding tape around the trunk line and fixing the joint connector to the trunk line by use of the first binding tape to be continuously and efficiently performed. Furthermore, the second binding tape for suppressing the displacement of the joint connector fixed onto the trunk line is also permitted to be simply wound from outside of the first binding tape having been already wound around the joint-connector setup location, in the circumferential direction of the trunk line; thus, the winding operation of the second binding tape is also easy.

Alternatively, to fix the joint connector onto the trunk line, it may be included that: the binding tape is wound around the trunk line; thereafter the joint connector is placed on the binding tape wound around the trunk line; and the binding tape is continuously wound across and around the joint connector and the trunk line around which the binding tape has been already wound.

Also this method allows winding of the binding tape to the trunk line and fixing of the joint connector to the trunk line to be continuously and efficiently performed, and permits obtaining a wire harness in which the joint connector fixed onto the trunk line is hard to displace in the circumferential direction of the trunk line through an easy winding operation of the binding tape.

What is claimed is:

1. A wire harness including a plurality of short circuits the wire harness comprising a plurality of circuit modules each making up the respective short circuits and a binding tape for fixing the circuit modules together in a bundle, each of the circuit modules including: a plurality of electric wires; a plurality of external-connection connectors each connected to respective first ends of the electric wires; and a joint connector connected to respective second ends, opposite to the first ends respectively, of the electric wires to short-circuit the second ends of the electric wires wherein the electric wires constituting the circuit modules are bundled together in such a manner that the joint connector of each of the circuit modules is discretely disposed so as to be located in a vicinity of at least one of the external-connection connectors included in the circuit module, and the binding tape is wound around the bundled electric wires, wherein the electric wires constituting the circuit modules are bundled together to thereby form a trunk line, and respective ends of the electric wires included in a common one of the circuit modules are extracted from the trunk line to form a plurality of branch wires, to the ends of which the respective joint connectors are commonly connected, and wherein the binding tape is continuously wound across and around the joint connector, the branch wires and the trunk line to fix the joint connector onto the trunk line.

2. The wire harness as defined in claim 1, wherein the joint connector included in each of the circuit modules comprises: a short-circuiting metal plate formed of a single metal plate and including a plurality of fitting portions to be fitted with respective wire terminals provided at the ends of the branch wires so as to short-circuit the branch wires in the fitted state, and an insulation housing holding the short-circuiting metal plate and having an outer shape flattened in a thickness direction of the short-circuiting metal plate, the joint connector being fixed onto the trunk line in such a posture that the short-circuiting metal plate is approximately perpendicular to a radial direction of the trunk line.

3. The wire harness as defined in claim 2, wherein a ratio of a width dimension of the joint connector to a diameter of the trunk line is 0.8 or less.

4. The wire harness as defined in claim 1, wherein the joint connector in at least one of the circuit modules includes a short-circuiting conductor fittable with a plurality of wire terminals attached to the respective ends of the electric wires, the electric wires including a copper-based electric wire comprising a conductor made of copper or a copper alloy, and a non-copper based electric wire comprising a conductor made of a material other than copper and a copper alloy and having a weight per unit length and a diameter at least one of which is less than that of the copper-based electric wire, the electric wires being short-circuited to each other through the common joint connector.

5. The wire harness as defined in claim 4, wherein the non-copper based electric wire includes at least one of: a composite electric wire which comprises a conductor including a strand made of copper or a copper alloy and a strand made of stainless steel and has a diameter less than that of the copper-based electric wire; and an aluminum-based electric wire which comprises a conductor made of aluminum or an aluminum alloy and has a weight per unit length less than that of the copper-based electric wire.

6. The wire harness as defined in claim 1, wherein, under a condition that the joint connector is set up on the trunk line while each of the branch wires is folded so as to have an intermediate portion bulging out from a branch starting position of the branch wire in a direction along the trunk line, the binding tape being continuously wound across and around the joint connector, the branch wires and the trunk line to fix the joint connector onto the trunk line.

7. The wire harness as defined in claim 6, wherein the joint connector is fixed in a vicinity of the branch starting position of each of the branch wires from the wire harness.

8. The wire harness as defined in claim 1, wherein the binding tape continuously has a first portion wound at least one turn around the joint connector and a second portion continuously wound across and around the joint connector around which the first portion is wound, and the trunk line, to fix the joint connector onto the trunk line.

9. The wire harness as defined in claim 8, wherein, the branch wires are set up on the trunk line so as to extend along a surface of the trunk line, the binding tape being continuously wound across and around the branch wire and the trunk line.

10. The wire harness as defined in claim 8, wherein the joint connector comprises: a short-circuiting metal plate formed of a single metal plate and including a plurality of fitting portions capable of being fitted with respective wire terminals provided at the ends of the branch wires to short-circuit the branch wires; and an insulation housing which includes a plurality of terminal-receiving chambers each having a shape into which the wire terminal can be inserted to be fitted with the fitting portion and has an outer shape flattened in a thickness direction of the short-circuiting metal plate so that the terminal-receiving chambers are arranged side-by-side along the short-circuiting metal plate at positions corresponding to the respective fitting portions, the insulation housing having a wall portion which is located on one side in the thickness direction to delimit a bound between each of the terminal-receiving chambers and an outside thereof, the wall portion formed with a plurality of terminal-locking portions at respective positions corresponding to the terminal-receiving chambers, each of the terminal-locking portions adapted to be deflected outwardly beyond an outer surface of the insulation housing, when each of the wire terminals is inserted into corresponding one of the terminal-receiving chambers, to permit the wire terminal to pass through the terminal-locking portion, and, after the passing, return to a normal position to lock the wire terminal in a position where the wire terminal is fitted with corresponding one of the fitting portions; and wherein, the joint connector is fixed onto the trunk line in such a posture that the short-circuiting metal plate is approximately perpendicular to a radial direction of the trunk line, in a state where the binding tape is already wound around the insulation housing so as to cross all of regions where the terminal-locking portions are formed respectively.

11. The wire harness as defined in claim 1, wherein the binding tape comprises: a first binding tape wound around the electric wires constituting the trunk line to keep the electric wires bound, and, in a joint-connector setup location on the trunk line, continuously wound across and around the joint connector and the trunk line; and a second binding tape additionally wound from outside of the first binding tape in the setup location of the joint connector on the trunk line, so as to assist tightening the joint connector to the trunk line in the joint-connector setup location by the first binding tape.

12. The wire harness as defined in claim 11, wherein the second binding tape is different in color from the first binding tape.

13. The wire harness as defined in claim 11, wherein, the joint connector is set up on the trunk line while each of the branch wires is folded so as to have an intermediate portion bulging out from a branch starting position of the branch wire in a direction along the trunk line, the first binding tape being continuously wound across and around the branch wire and the trunk line.

14. The wire harness as defined in claim 11, wherein the joint connector comprises: a short-circuiting metal plate formed of a single metal plate and including a plurality of fitting portions capable of being fitted with respective wire terminals provided at the ends of the branch wires to short-circuit the branch wires; and an insulation housing which includes a plurality of terminal-receiving chambers each having a shape into which the wire terminal can be inserted to be fitted with the fitting portion and has an outer shape flattened in a thickness direction of the short-circuiting metal plate so that the terminal-receiving chambers are arranged side-by-side along the short-circuiting metal plate at positions corresponding to the respective fitting portions, the insulation housing having a wall portion which is located on one side in the thickness direction to delimit a bound between each of the terminal-receiving chambers and an outside thereof, the wall portion formed with a plurality of terminal-locking portions at respective positions corresponding to the terminal-receiving chambers, each of the terminal-locking portions adapted to be deflected outwardly beyond an outer surface of the insulation housing, when each of the wire terminals is inserted into corresponding one of the terminal-receiving chambers, to permit the wire terminal to pass through the terminal-locking portion, and, after the passing, return to a normal position to lock the wire terminal in a position where the wire terminal is fitted with corresponding one of the fitting portions, the joint connector being set up on the trunk line in such a posture that the wall portion formed with the terminal-locking portions faces oppositely to the trunk line and the short-circuiting metal plate is approximately perpendicular to a radial direction of the trunk line; and wherein, each of the first binding tape and the second binding tape is wound so as to cross all of the positions where the terminal-locking portions are formed respectively.

15. The wire harness as defined in claim 1, wherein the binding tape continuously has a first portion wound around the trunk line and a second portion continuously wound across and around the first portion and the joint connector placed on the first portion to thereby fix the joint connector onto the trunk line.

16. The wire harness as defined in claim 15, wherein, the joint connector is placed on the trunk line around which the binding tape is wound while each of the branch wires is folded so as to have an intermediate portion bulging out from a branch starting position of the branch wire in a direction along the trunk line, the binding tape being continuously wound across and around the branch wire and the trunk line.

17. The wire harness as defined in claim 15, wherein the joint connector comprises: a short-circuiting metal plate formed of a single metal plate and including a plurality of fitting portions capable of being fitted with respective wire terminals provided at the ends of the branch wires to short-circuit the branch wires; and an insulation housing which includes a plurality of terminal-receiving chambers each having a shape into which the wire terminal can be inserted to be fitted with the fitting portion and has an outer shape flattened in a thickness direction of the short-circuiting metal plate so that the terminal-receiving chambers are arranged side-by-side along the short-circuiting metal plate at positions corresponding to the respective fitting portions, the insulation housing having a wall portion which is located on one side in the thickness direction to delimit a bound between each of the terminal-receiving chambers and an outside thereof, the wall portion formed with a plurality of terminal-locking portions at respective positions corresponding to the terminal-receiving chambers, each of the terminal-locking portions adapted to be deflected outwardly beyond an outer surface of the insulation housing, when each of the wire terminals is inserted into corresponding one of the terminal-receiving chambers, to permit the wire terminal to pass through the terminal-locking portion, and, after the passing, return to a normal position to lock the wire terminal in a position where the wire terminal is fitted with corresponding one of the fitting portions; and wherein, the joint connector is placed on the binding tape wound around the trunk line in such a posture that the wall portion formed with the terminal-locking portion faces oppositely to the trunk line and the short-circuiting metal plate is approximately perpendicular to a radial direction of the trunk line, and fixed onto the trunk line by the binding tape wound around so as to cross all of regions where the terminal-locking portions are formed respectively.

* * * * *